US012745707B1

(12) United States Patent
Gan et al.

(10) Patent No.: US 12,745,707 B1
(45) Date of Patent: Sep. 29, 2026

(54) GRASS COLLECTION MECHANISM, GRASS COLLECTION DEVICE, AND LAWN MOWER

(71) Applicants: Shuai Gan, Shenzhen (CN); Yiqi Chen, Shenzhen (CN)

(72) Inventors: Shuai Gan, Shenzhen (CN); Yiqi Chen, Shenzhen (CN); Gengyu Wu, Shenzhen (CN)

(73) Assignee: SHENZHEN ZONGGUAN INNOVATION CO., LTD., Shenzhen (CN)

( * ) Notice: Subject to any disclaimer, the term of this patent is extended or adjusted under 35 U.S.C. 154(b) by 0 days.

(21) Appl. No.: 19/333,792

(22) Filed: Sep. 19, 2025

Related U.S. Application Data

(63) Continuation of application No. PCT/CN2024/079994, filed on Mar. 4, 2024.

(30) Foreign Application Priority Data

Mar. 20, 2023 (CN) ......................... 202320592271.5
Jun. 15, 2023 (CN) ......................... 202321539454.7
Jun. 15, 2023 (CN) ......................... 202321541323.2

(51) Int. Cl.
*A01D 43/063* (2006.01)
*A01D 101/00* (2006.01)

(52) U.S. Cl.
CPC ..... *A01D 43/0636* (2013.01); *A01D 43/0631* (2013.01); *A01D 2101/00* (2013.01)

(58) Field of Classification Search
CPC ............ A01D 43/0636; A01D 43/0631; A01D 2101/00
See application file for complete search history.

(56) References Cited

U.S. PATENT DOCUMENTS

| | | | | | |
|---|---|---|---|---|---|
| 3,386,234 | A * | 6/1968 | Leader | A01D 43/063 | 56/202 |
| 4,964,266 | A * | 10/1990 | Kolb | A01D 43/0631 | 56/16.6 |
| 2009/0320433 | A1 * | 12/2009 | Kuramoto | A01D 43/0631 | 56/202 |
| 2011/0120072 | A1 * | 5/2011 | Fukumoto | A01D 43/0635 | 56/202 |
| 2020/0029502 | A1 * | 1/2020 | Hultgren | A01D 43/063 | |
| 2022/0174869 | A1 * | 6/2022 | Kutsuna | A01D 43/0638 | |

* cited by examiner

*Primary Examiner* — William D Hutton, Jr.
*Assistant Examiner* — Jose Antonio Martinez
(74) *Attorney, Agent, or Firm* — BAYES PLLC

(57) ABSTRACT

The present disclosure provides a grass collection mechanism, a grass collection device, and a lawn mower. The grass collection mechanism includes a grass collection frame and a conductive detection sensor. The conductive detection sensor is configured to detect whether the grass collection frame is full and includes at least one detection unit and a processing unit. The at least one detection unit is arranged on top of the grass collection frame and configured to be electrically connected to cut grass. The processing unit is electrically connected to the detection unit and configured to determine whether the detection unit is electrically conductive with the cut grass.

18 Claims, 19 Drawing Sheets

GRASS COLLECTION MECHANISM, GRASS COLLECTION DEVICE, AND LAWN MOWER

CROSS-REFERENCE TO RELATED APPLICATION

This application is a continuation of International Application No. PCT/CN2024/079994, filed on Mar. 4, 2024, which claims the benefit of priority to Chinese Patent Application No. 202320592271.5, filed on Mar. 20, 2023, to Chinese Patent Application No. 202321539454.7, filed on Jun. 15, 2023, and to Chinese Patent Application No. 202321541323.2, filed on Jun. 15, 2023. The contents of the above-referenced applications are hereby incorporated by reference in their entireties.

TECHNICAL FIELD

The present disclosure relates to the technical field of lawn mowers, and in particular, to a grass collection mechanism, a grass collection device, and a lawn mower.

BACKGROUND

A mowing robot needs to collect grass. When the grass collection container is full, a signal needs to be sent to the main board. At this time, a detection device for identifying whether the grass is full is needed. For example, Chinese Patent Application No. 202211131924.6, entitled "A Mowing Device," uses a movable part to trigger a micro switch. In actual use, this type of device can get stuck with grass debris, resulting in failure. Moreover, the grass needs to push the micro switch to trigger it, which requires sufficient thrust, making it difficult to achieve for ordinary small lawn mowers, and the accuracy of grass-full detection is poor. In some implementations, distance sensor solutions such as infrared, laser, ultrasonic, or millimeter-wave radar can be used for detection, but these types of sensors have unstable data when identifying messy or flying grass debris, and the accuracy of grass-full detection is poor.

SUMMARY

The main purpose of the present disclosure is to provide a grass collection mechanism, a grass collection device, and a lawn mower. The grass collection mechanism includes: a grass collection frame and at least one conductive detection sensor. The conductive detection sensor is configured to detect whether the grass collection frame is full. The conductive detection sensor includes a detection unit and a processing unit. The detection unit is arranged on the top of the grass collection frame and is configured to be electrically connected to the cut grass. The processing unit is electrically connected to the detection unit and is configured to determine whether the detection unit is electrically conductive with the cut grass.

A grass collection device is also provided, which includes: a grass collection frame and a grass collection bag. The grass collection frame includes a front frame body and a rear frame body. The front frame body is configured to connect to the lawn mower body. The front frame body is detachably connected to the lawn mower body, and the rear frame body is rotatably connected to the front frame body. The grass collection bag includes a front bag portion and a rear bag portion. The front bag portion is adapted to the front frame body, the rear bag portion is adapted to the rear frame body, and the front bag portion and the rear bag portion are connected in an openable manner.

A grass collection device is also provided, which includes: a grass collection frame and a drive mechanism. The front side of the grass collection frame is configured to connect to the lawn mower body, and the drive mechanism is connected to the grass collection frame to drive the grass collection frame to expand to increase the opening size of the grass discharge opening of the grass collection device.

Based on the same creative concept, the present disclosure also provides a lawn mower including the above-mentioned grass collection device.

BRIEF DESCRIPTION OF DRA WINGS

DETAILED DESCRIPTION

Figure 1:
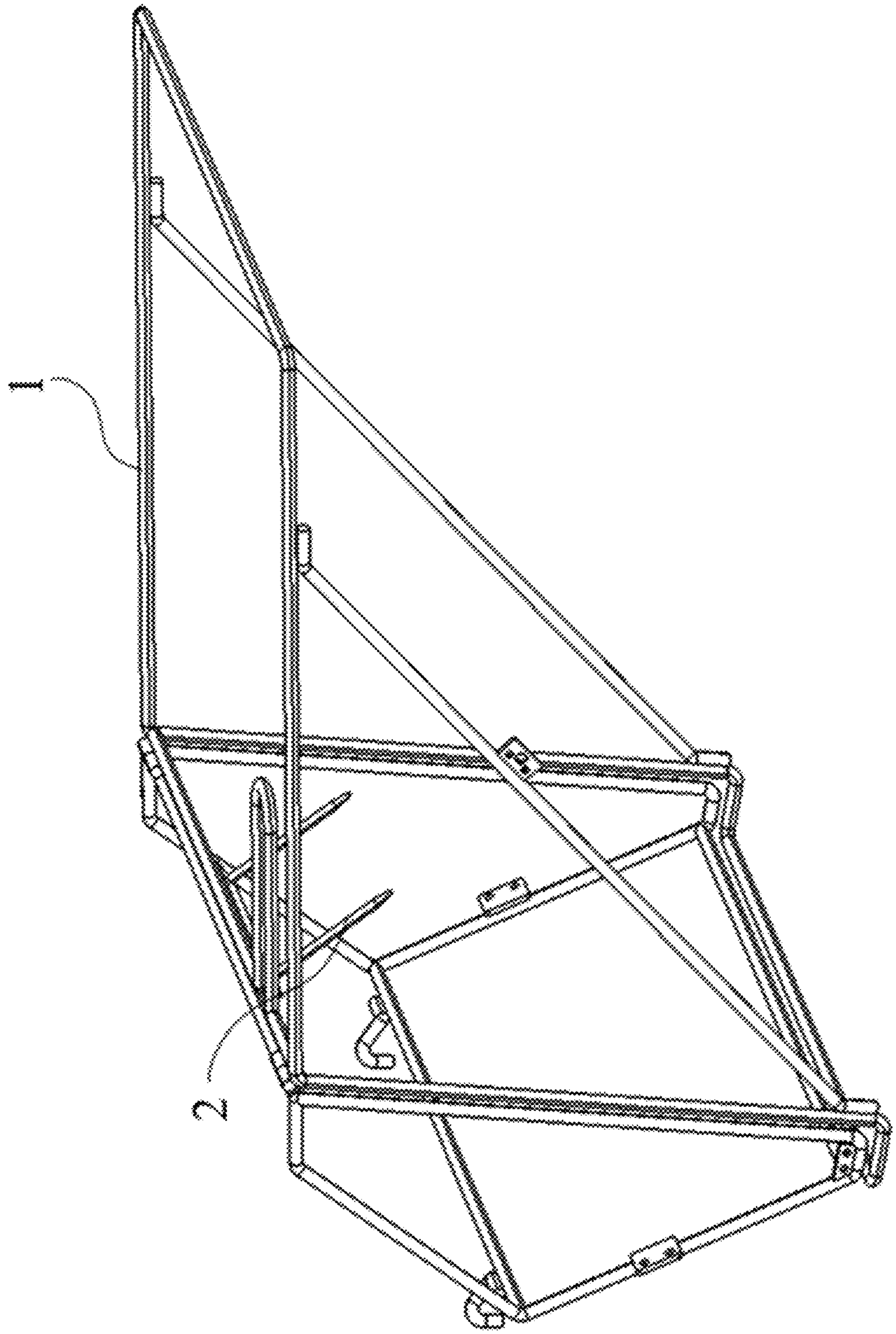
FIG. 1 is a structural schematic diagram of an implementation according to the present disclosure.

For ease of understanding the present disclosure, the following provides a more detailed description of the present disclosure in conjunction with the drawings and specific implementations. The drawings show preferred implementations of the present disclosure. However, the present disclosure can be implemented in many different forms and is not limited to the implementations described in this specification. On the contrary, the purpose of providing these implementations is to make the disclosure of the present disclosure more thorough and comprehensive.

It should be noted that, unless otherwise defined, all technical and scientific terms used in this specification have the same meaning as commonly understood by those skilled in the art to which the present disclosure belongs. The terms used in the specification of the present disclosure are only for the purpose of describing specific implementations and are not intended to limit the present disclosure. The term "and/or" as used in this specification includes any and all combinations of one or more of the associated listed items.

FIGS. 1 to 6 show implementations of the grass collection mechanism of the present disclosure, which include a grass collection frame 1 and at least one conductive detection sensor. The conductive detection sensor is configured to detect whether the grass collection frame 1 is full. The conductive detection sensor includes a detection unit 2 and a processing unit (not shown in the drawings). The detection unit 2 is arranged on the top of the grass collection frame 1 and is configured to be electrically connected to the cut grass. The processing unit is electrically connected to the detection unit 2 and is configured to determine whether the detection unit 2 is electrically conductive with the cut grass.

In the present disclosure, the detection unit 2 is arranged inside the grass collection frame 1. When the grass inside the grass collection frame 1 is not full, the detection unit 2 is in a disconnected state. As the amount of grass inside the grass collection frame 1 increases and reaches the top of the grass collection frame 1, due to the conductivity of the grass, the detection unit 2 is conducted through the grass. After the processing unit detects that the detection unit 2 is conducted, it can be determined that the grass inside the grass collection frame 1 is full. Whether the detection unit 2 is conducted is configured to determine whether the grass collection frame 1 is full, which avoids the influence of dust and grass debris during grass collection, and can greatly improve the accuracy of grass-full detection. The data stability of grass-full detection is high, and the determination is relatively simple.

The processing unit can be a microcontroller or a controller of the lawn mower, etc. The detection unit 2 can be electrically connected to the processing unit via a wire.

The detection unit 2 can be arranged at the middle position of the top of the grass collection frame 1, at the edge of the top, at the corner of the top, and at other positions. The position of the detection unit 2 is the maximum position that the grass can reach after the grass is full.

The number of detection units 2 can be multiple. Multiple detection units 2 can form different shapes, for example, the detection units 2 can be arranged in a circular, linear, polygonal, or other shapes. The shape can be arranged in correspondence with the shape of the grass collection frame 1, so as to detect the grass collection situation at different corresponding positions.

The detection units 2 are arranged in a straight line at intervals on the top of the grass collection frame 1. This allows the detection units 2 to cover the entire top of the grass collection frame 1, so that when the grass is full, accurate detection can be performed.

The detection units 2 are arranged on each edge of the grass collection frame 1. This allows the detection units 2 to cover the entire edge of the grass collection frame 1, so that when the grass is full, accurate detection can be performed.

In some implementations, the detection unit 2 includes a first conductor 21 configured to serve as a positive electrode and a second conductor 22 configured to serve as a negative electrode, both electrically connected to the processing unit. The first conductor 21 and the second conductor 22 are spaced apart and protrude from the grass collection frame 1 and extend by a preset distance.

The material of the first conductor 21 and the second conductor 22 can be a conductive metal material, for example, iron, aluminum, copper, and other metals. The first conductor 21 and the second conductor 22 can be spaced apart and arranged on an insulating fixing plate 23. When no grass electrically connects the first conductor 21 with the second conductor 22, the first conductor 21 and the second conductor 22 are not conductive. When grass electrically connects the first conductor 21 with the second conductor 22, the first conductor 21 and the second conductor 22 are conductive, which indicates that the space between the first conductor 21 and the second conductor 22 is filled with grass, that is, the grass inside the grass collection frame 1 is full.

Figure 2:
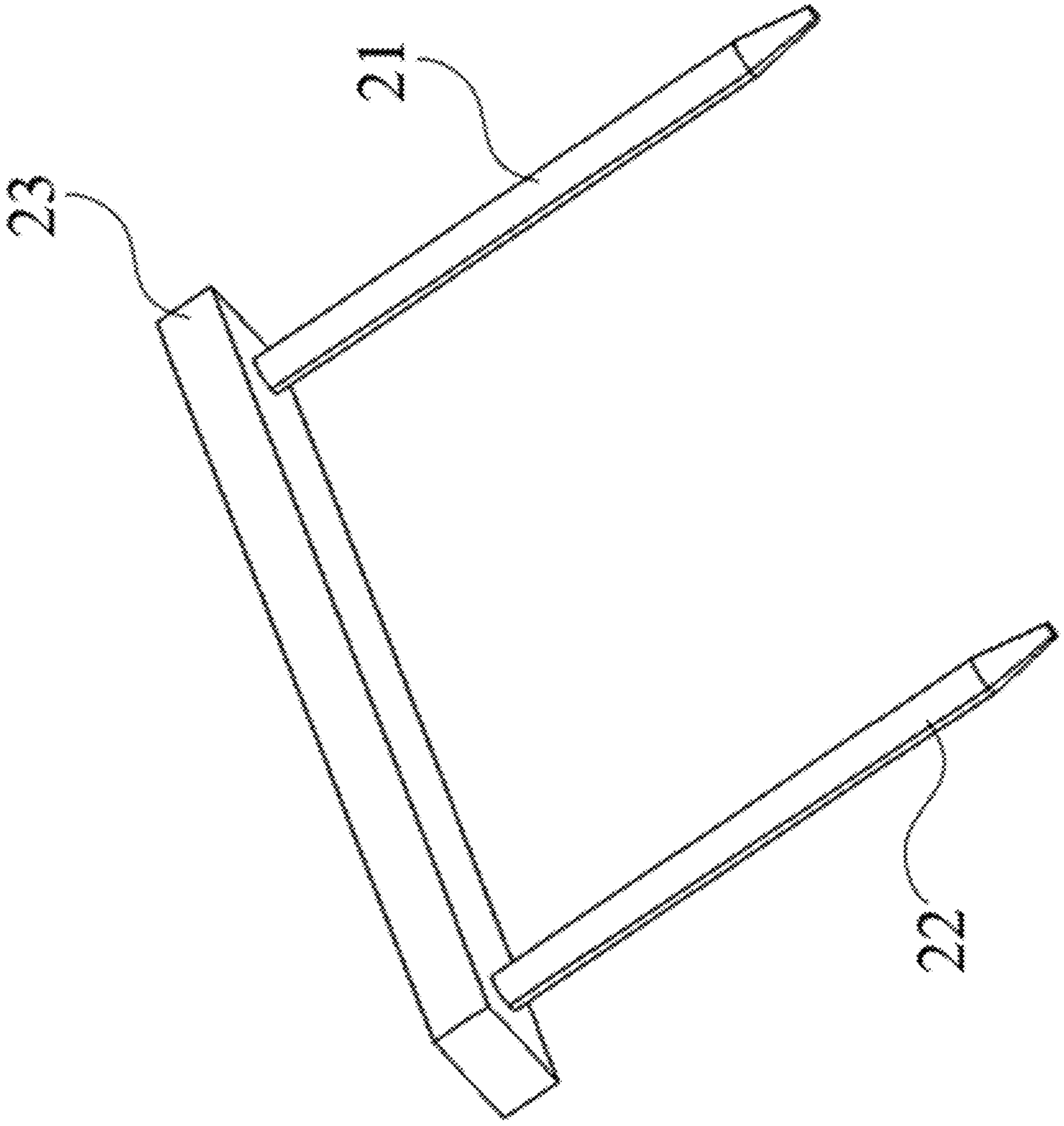
FIG. 2 is a structural schematic diagram of the detection unit according to an implementation of the present disclosure.

The first conductor 21 and the second conductor 22 can be in a one-to-one correspondence, as shown in FIGS. 1 and 2, that is, one first conductor 21 corresponds to one second conductor 22. When the corresponding first conductor 21 and second conductor 22 are conductive, it indicates that the grass inside the grass collection frame 1 is full. When the first conductor 21 and the second conductor 22 are in a one-to-one correspondence, they can be arranged in pairs.

Figure 3:
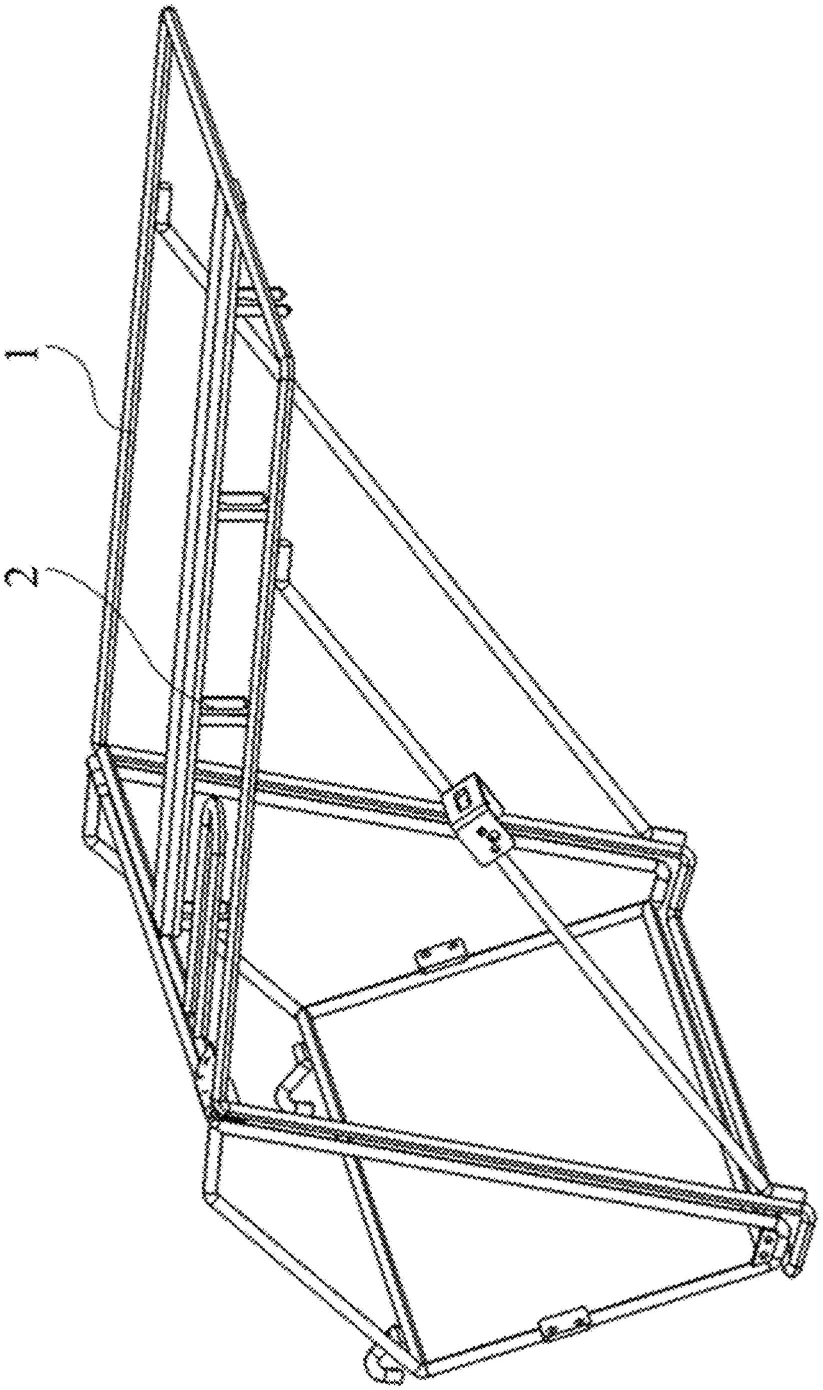
FIG. 3 is a structural schematic diagram of another implementation according to the present disclosure.
Figure 4:
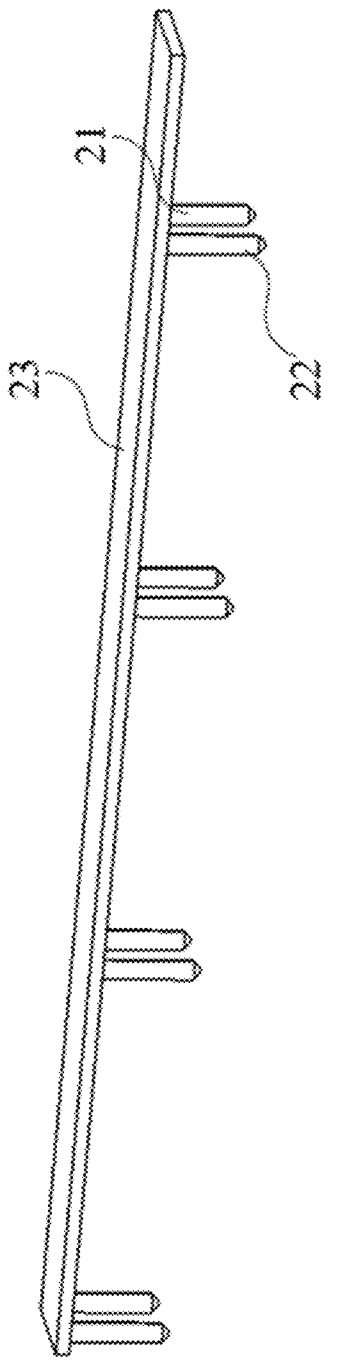
FIG. 4 is a structural schematic diagram of the detection unit according to another implementation of the present disclosure.

The first conductor 21 and the second conductor 22 can also be in a one-to-many relationship, as shown in FIGS. 3 and 4, that is, one first conductor 21 can correspond to multiple second conductors 22, or one second conductor 22 can correspond to multiple first conductors 21. When the first conductor 21 and the second conductor 22 are in a one-to-many relationship, if any one of the first conductor 21 and the multiple second conductors 22 is conductive, it can indicate that the grass inside the grass collection frame 1 is full. Or, if multiple or all of the first conductor 21 and the multiple second conductors 22 are conductive, it can also indicate that the grass inside the grass collection frame 1 is full. The more first conductors 21 and second conductors 22 there are, the higher the accuracy of grass-full detection. Those skilled in the art can make reasonable settings according to factors such as cost and the structure of the grass collection frame 1. The detection of multiple first conductors 21 and second conductors 22 can be combined with algorithms to determine the current position and progress of grass loading, which is beneficial for planning corresponding actions.

The detection unit 2 is in any form of a conductive pillar, a conductive plate, a conductive block, a conductive film, an electrode, a conductive bump, or a conductive sheet. That is, the shapes of the first conductor 21 and the second conductor 22 can be columnar, plate-shaped, block-shaped, film-shaped, point-shaped, sheet-shaped, and other forms, as long as they protrude from the grass collection frame 1 by a preset distance so that the grass can contact them.

In some implementations, the detection unit 2 is in the form of a conductive pillar. The preset distance is approximately 0.5 cm to 5 cm.

To cope with extreme scenarios, such as when completely dry grass or fallen leaves are cut and the detection unit 2 cannot be conducted, other sensors can be added to assist in grass-full detection.

Figure 5:
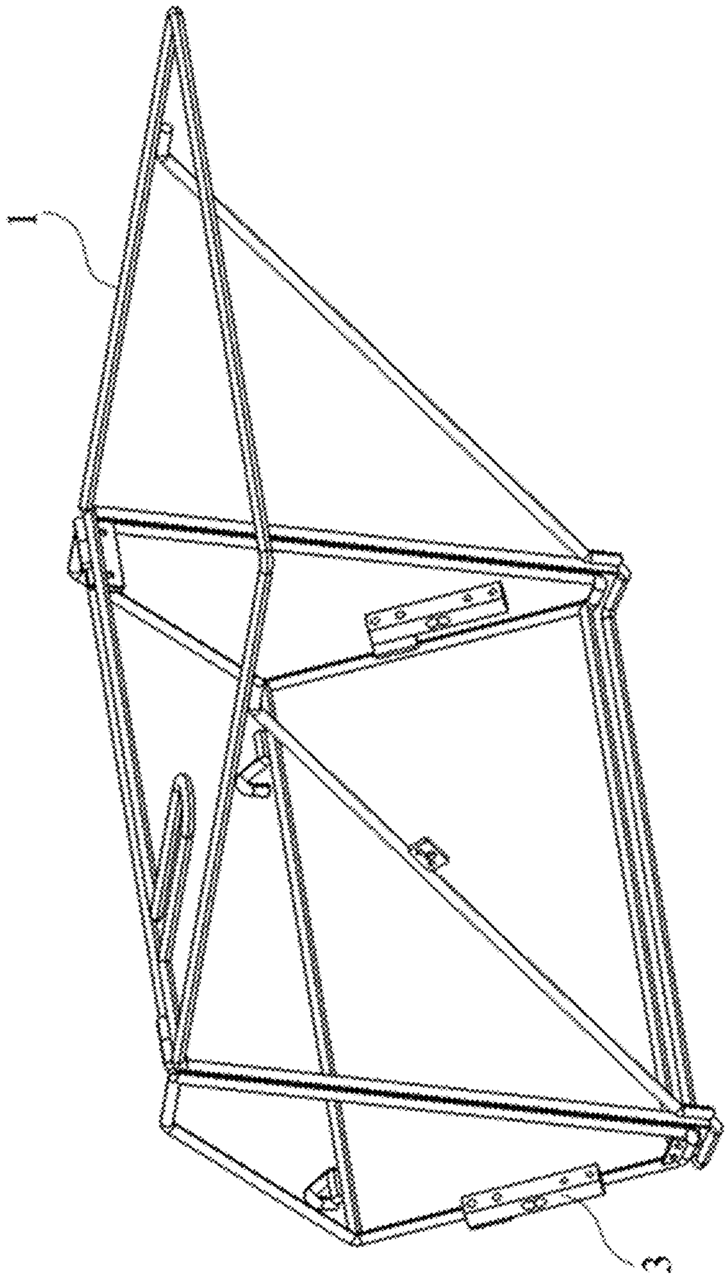
FIG. 5 is a structural schematic diagram of installing a weight sensor according to another implementation of the present disclosure.

In some implementations, as shown in FIG. 5, the grass collection mechanism further includes a weight sensor 3, which is configured to detect the weight of the grass collected by the grass collection mechanism. The weight sensor 3 can be a pressure sensor, a piezoresistive sensor, a thin-film pressure sensor, etc. The weight sensor 3 can be arranged at the lower part of the grass collection frame 1. The amount of grass inside the grass collection frame 1 can be determined according to the pressure received by the weight sensor 3, and whether the grass inside the grass collection frame 1 is full can be determined in combination with the weight sensor 3.

Figure 6:
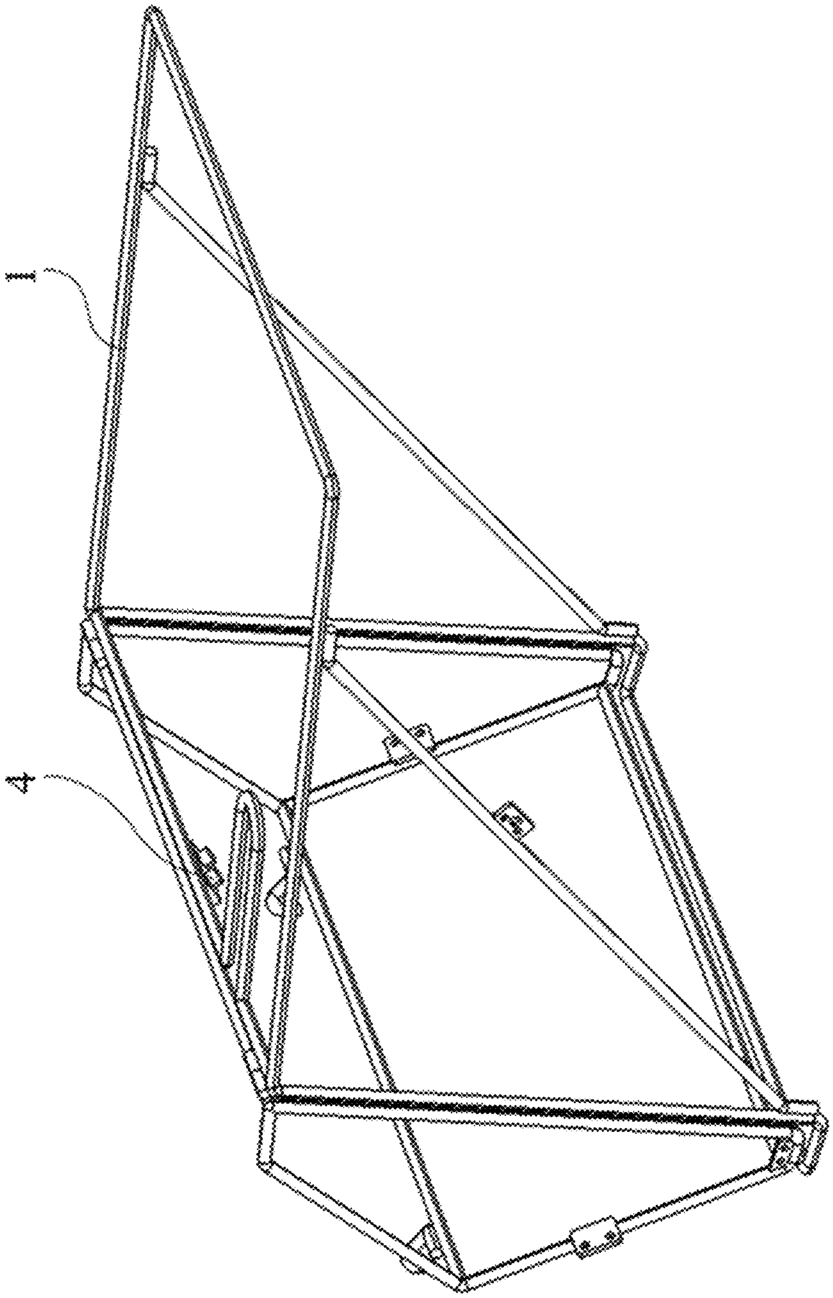
FIG. 6 is a structural schematic diagram of installing a distance sensor according to another implementation of the present disclosure.

In some implementations, as shown in FIG. 6, the grass collection mechanism further includes a distance sensor 4, which is configured to detect the distance between the grass collected in the grass collection frame 1 and the top of the grass collection frame 1. The distance sensor 4 can be arranged at the top of the grass collection frame 1 to determine the distance between the grass and the top of the grass collection frame 1. When the distance between the grass and the top of the grass collection frame 1 is less than a predetermined number between 0.2 cm and 0.5 cm, such as 0.2 cm, 0.3 cm. 0.35 cm, 0.43 cm, 0.5 cm, etc., it can be determined that the grass inside the grass collection frame 1 is full.

The distance sensor 4 is one of infrared, laser, ultrasonic, or millimeter-wave radar. In some implementations, millimeter-wave radar is used. Millimeter-wave radar has the characteristics of small size, light weight, and high spatial resolution. Compared with infrared, laser, television, etc., millimeter-wave radar has a strong penetration ability through fog, smoke, and dust, and can reduce the influence of grass dust on the accuracy of grass-full detection.

When millimeter-wave radar and the detection unit are used together to detect grass-full, the detection unit can also be arranged in the form of a conductive pillar made of carbon fiber. Millimeter-wave radar can more accurately detect the conductive pillar made of carbon fiber, and carbon fiber is lighter, which avoids greatly increasing the weight of the lawn mower. During use, millimeter-wave radar scans to identify whether the grass covers the conductive pillar. When the millimeter-wave radar cannot scan the conductive pillar, it indicates that the grass is full.

Based on the same concept, the present disclosure also provides a lawn mower, which includes a controller and the above-mentioned grass collection mechanism. When the grass collection mechanism detects that the grass is full, the controller controls the grass collection mechanism to empty the grass.

In the present disclosure, the detection unit is arranged inside the grass collection frame. When the grass inside the grass collection frame is not full, the detection unit is in a disconnected state. As the amount of grass inside the grass collection frame increases and reaches the top of the grass collection frame, due to the conductivity of the grass, the detection unit is conducted through the grass. After the processing unit detects that the detection unit is conducted, it can be determined that the grass inside the grass collection frame is full. Whether the detection unit is conducted is configured to determine whether the grass collection frame is full, which avoids the influence of dust and grass debris during grass collection, and can greatly improve the accuracy of grass-full detection. The data stability of grass-full detection is high, and the determination is relatively simple.

FIGS. 7 to 12 show implementations of the grass collection device of the present disclosure, which include a grass collection frame 1 and a grass collection bag 201. The grass collection frame 1 includes a front frame body 11 and a rear frame body 12. The front frame body 11 is configured to connect to the lawn mower body. The front frame body 11 is detachably connected to the lawn mower body, and the rear frame body 12 is rotatably connected to the front frame body 11. The grass collection bag 201 includes a front bag portion 2100 and a rear bag portion 2200. The front bag portion 2100 is adapted to the front frame body 11, the rear bag portion 2200 is adapted to the rear frame body 12, and the front bag portion 2100 and the rear bag portion 2200 are configured to be connected to each other in an openable manner.

In the present disclosure, the grass collection frame 1 adopts a two-part structure of the front frame body 11 and the rear frame body 12, which are rotatably connected. The grass collection bag 201 also adopts a two-part structure of the front bag portion 2100 and the rear bag portion 2200, which are configured to be connected to each other in an openable manner. When the grass collection bag 201 is sleeved on the grass collection frame 1, the front bag portion 2100 and the rear bag portion 2200 correspond to the front frame body 11 and the rear frame body 12, respectively. When the grass collection bag 201 is full of grass, the grass in the rear bag portion 2200 can be directly discharged by rotating the rear frame body 12, without removing the grass collection bag 201 to discharge the grass. At the same time, the two-part structure of the grass collection frame 1 facilitates the disassembly of the grass collection bag 201, making it easy to clean and replace.

The front frame body 11 is connected to the lawn mower body, and the connection method can be a snap-fit connection or a hook connection, etc.

Figure 8:
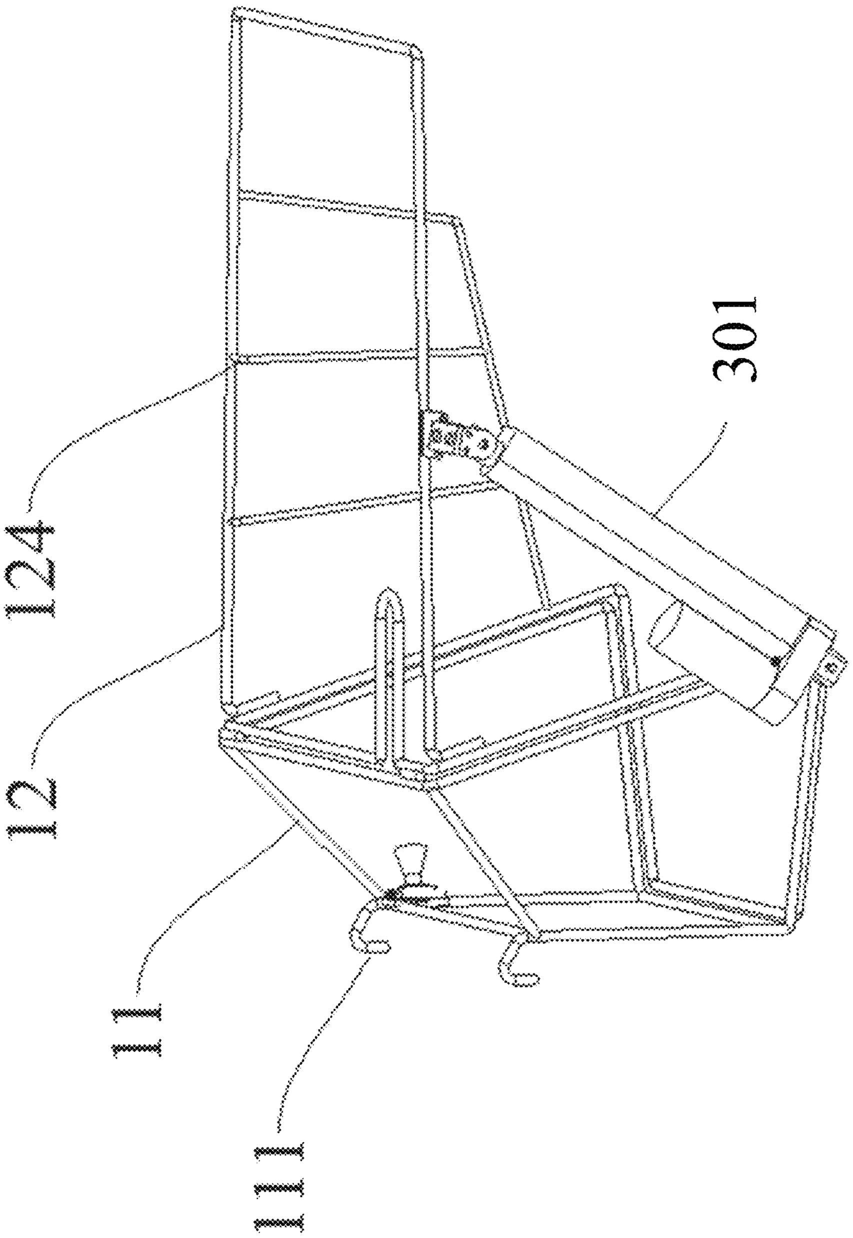
FIG. 8 is a structural schematic diagram of the grass collection frame according to an implementation of the present disclosure.
Figure 9:
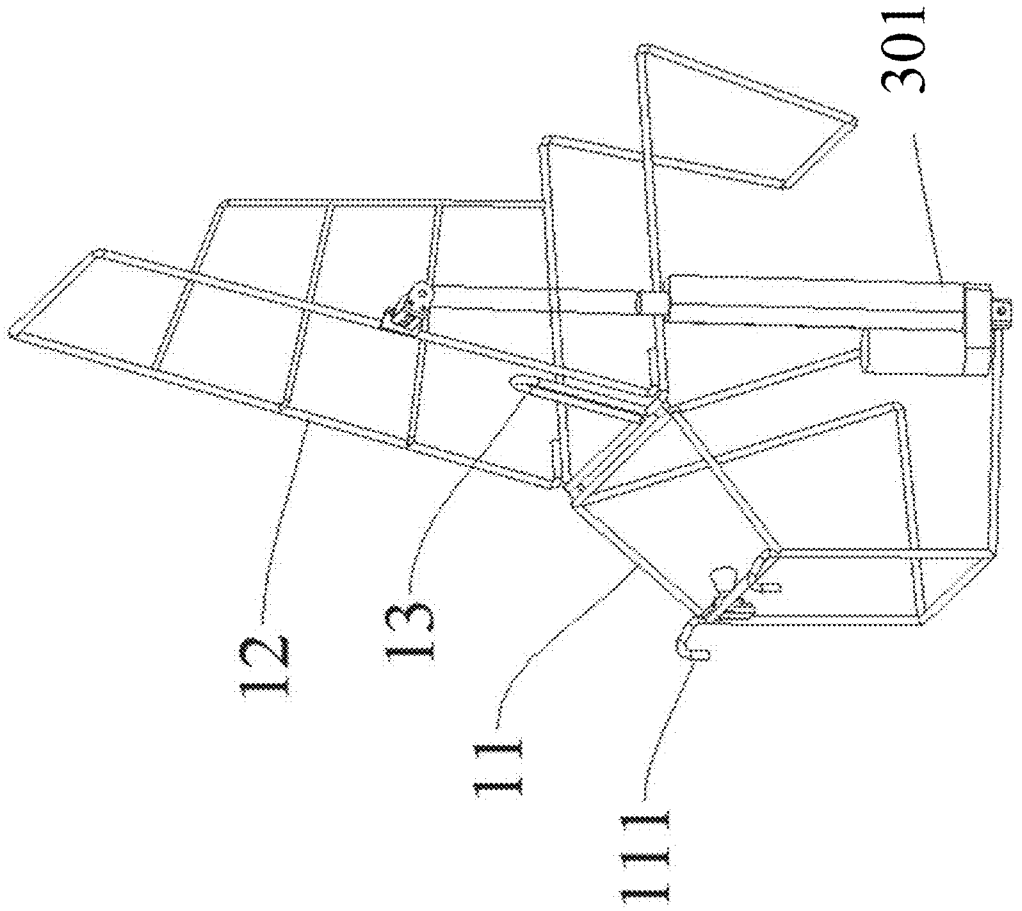
FIG. 9 is a structural schematic diagram of the grass collection frame in the expanded state according to an implementation of the present disclosure.

In some implementations, as shown in FIGS. 8 and 9, a hook 111 is provided on the front side of the front frame body 11, and the hook 111 is connected to the rear portion of the lawn mower body. The hook 111 is configured to connect the front frame body 11 to the rear portion of the lawn mower body, which facilitates the disassembly of the grass collection frame 1. To disassemble the grass collection frame 1, simply lift the grass collection frame 1 upward to disengage the hook 111 from the lawn mower body, thus completing the disassembly of the grass collection frame 1.

Figure 10:
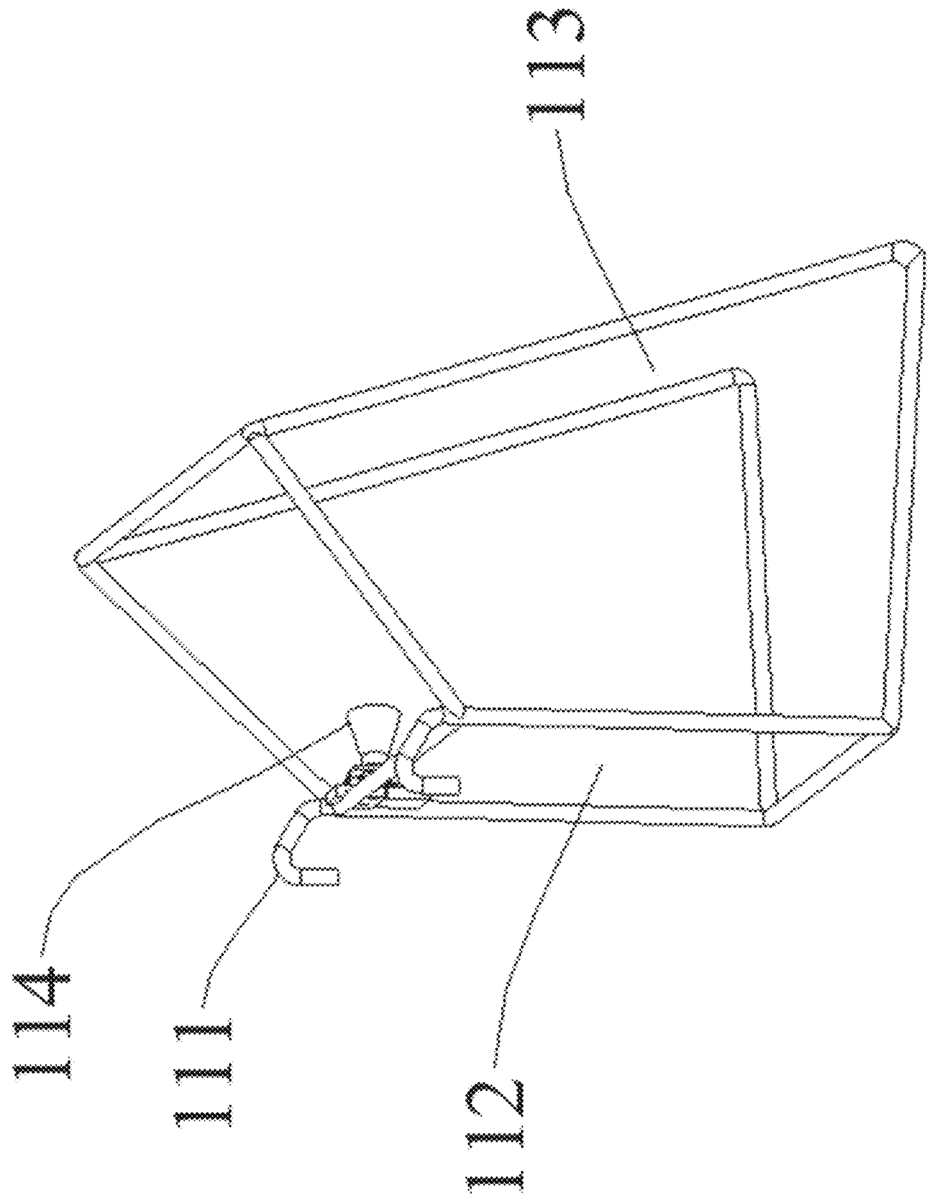
FIG. 10 is a structural schematic diagram of the front frame body according to an implementation of the present disclosure.

In some implementations, as shown in FIG. 10, the front frame body 11 includes a first opening 112 and a second opening 113, which are located at both ends of the front frame body 11, respectively. The first opening 112 is away from the rear frame body 12, and the shape of the first opening 112 is adapted to the shape of the grass discharge opening located at the rear portion of the lawn mower body, so that all the grass discharged from the grass discharge opening enters the grass collection frame 1 through the first opening 112. The second opening 113 is adjacent to the rear frame body 12 and is inclined, with the upper portion of the second opening 113 inclined toward the direction of the first opening 112. The inclined setting of the second opening 113 makes it easier for the grass to slide out of the rear frame body 12 when the rear frame body 12 is rotated to discharge the grass, maximizing the discharge of grass from the grass collection frame 1 and preventing grass from being left behind.

The first opening 112 of the front frame body 11 corresponds to the grass discharge opening at the rear side of the lawn mower. The waste grass discharged from the grass discharge opening enters the front frame body 11 through the first opening 112, and the second opening 113 of the front frame body 11 is adjacent to the rear frame body 12, so the waste grass enters the rear frame body 12 through the second opening 113.

Figure 11:
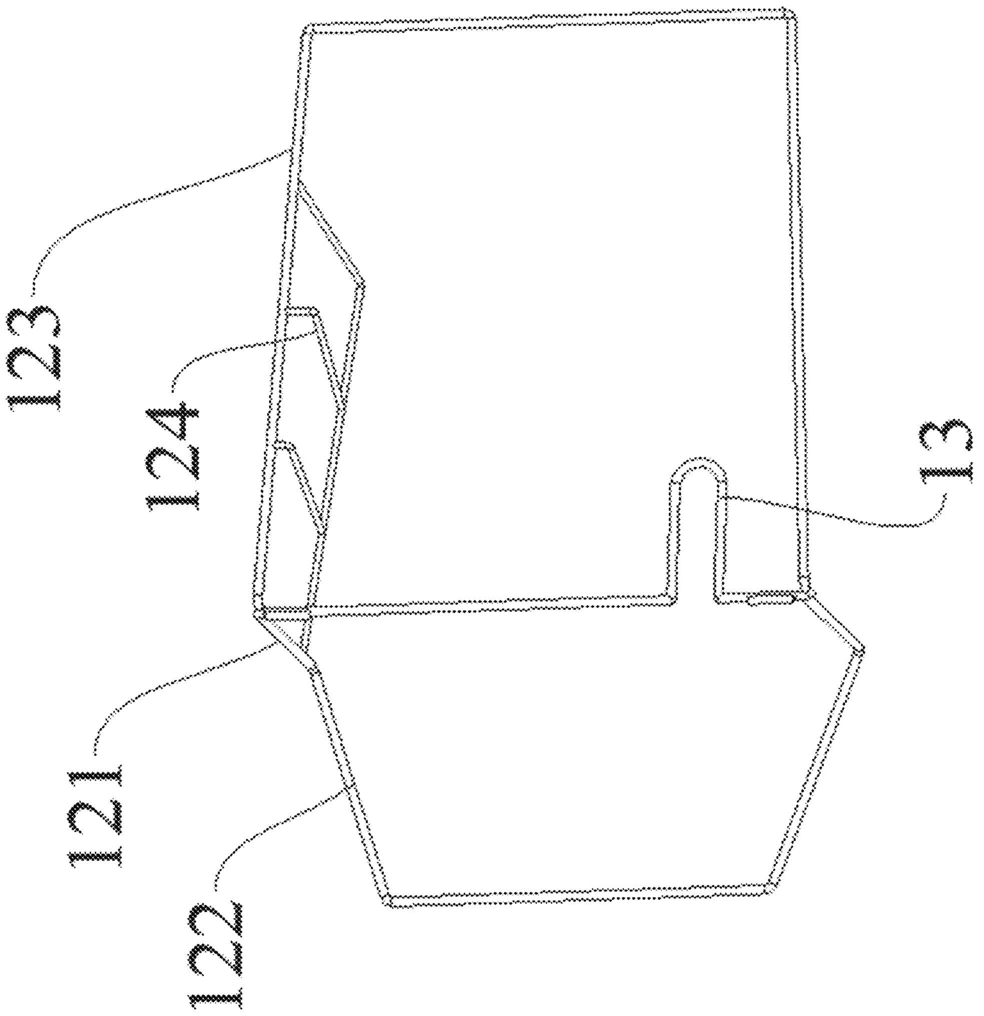
FIG. 11 is a structural schematic diagram of the rear frame body according to an implementation of the present disclosure.

In some implementations, as shown in FIG. 11, the rear frame body 12 includes a connecting portion 121, a first supporting portion 122, and a second supporting portion 123. The connecting portion 121 is adapted to the second opening 113, and the upper portion of the connecting portion 121 is hinged to the front frame body 11, thereby connecting the rear frame body 12 to the front frame body 11.

The first supporting portion 122 is arranged at the lower end of the connecting portion 121 and extends into the front frame body 11 to increase the stability of the rear frame body 12. The second supporting portion 123 is arranged at the upper end of the connecting portion 121 and extends in a direction away from the rear frame body 12. When the grass collection bag 201 is sleeved on the grass collection frame 1, the second supporting portion 123 and the connecting portion 121 support the rear bag portion 2200, making it easier for the waste grass to enter the rear bag portion 2200, and the expanded rear bag portion 2200 can hold more waste grass.

During normal use, the front bag portion 2100 is sleeved in the front frame body 11, and the rear bag portion 2200 is sleeved in the rear frame body 12. When the grass in the rear bag portion 2200 is full, the rear frame body 12 is rotated to discharge the grass in the rear bag portion 2200. Both the grass collection frame 1 and the grass collection bag 201 adopt a two-part structure, which not only facilitates the sleeving of the grass collection bag 201, but also allows the grass to be discharged without removing the grass collection bag 2 when the grass in the grass collection bag 201 is full.

The front bag portion 2100 and the rear bag portion 2200 can both be connected in an openable and closable manner, or a combination of openable and closable connections and a fixed connection can be used. When both are connected in an openable and closable manner, it facilitates the sleeving of the grass collection bag 201, but the connection between the front bag portion 2100 and the rear bag portion 2200 is not stable enough. When the rear frame body 12 is rotated to discharge the grass, the front bag portion 2100 and the rear bag portion 2200 may separate, resulting in grass leakage or the rear bag portion 2200 falling off.

Figure 12:
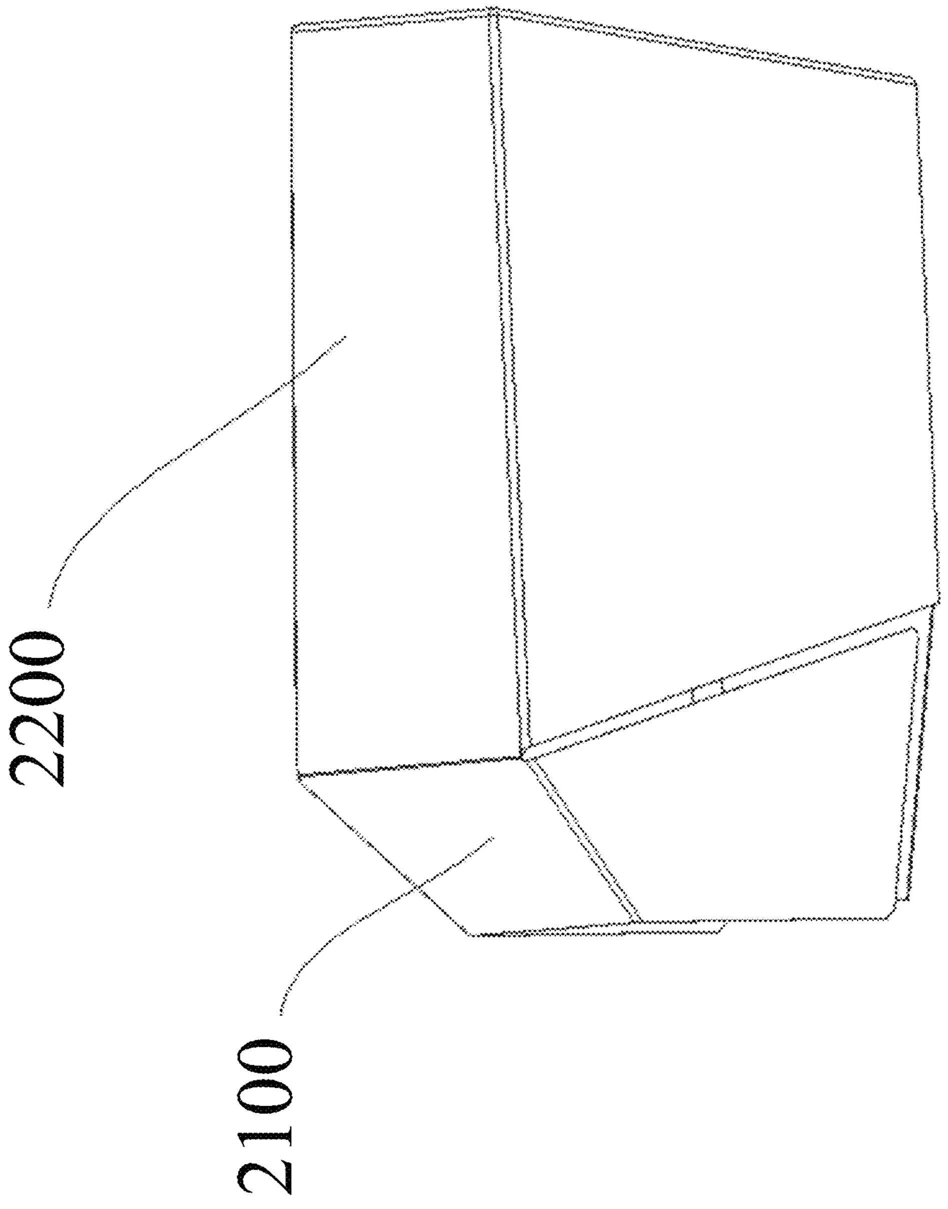
FIG. 12 is a structural schematic diagram of the grass collection bag according to an implementation of the present disclosure.

In some implementations, as shown in FIG. 12, the upper portion of the front bag portion 2100 and the upper portion of the rear bag portion 2200 are of an integrated structure, and the left side portion, right side portion, and lower side portion of the front bag portion 2100 and the rear bag portion 2200 are configured to be connected in an openable manner. In this way, while ensuring that the rear bag portion 2200 will not separate from the front bag portion 2100, it also facilitates the sleeving of the grass collection bag 201.

When rotating the rear frame body 12 to discharge the grass, it can be rotated directly by manpower, but using manpower to discharge the grass is time-consuming and laborious.

Figure 7:
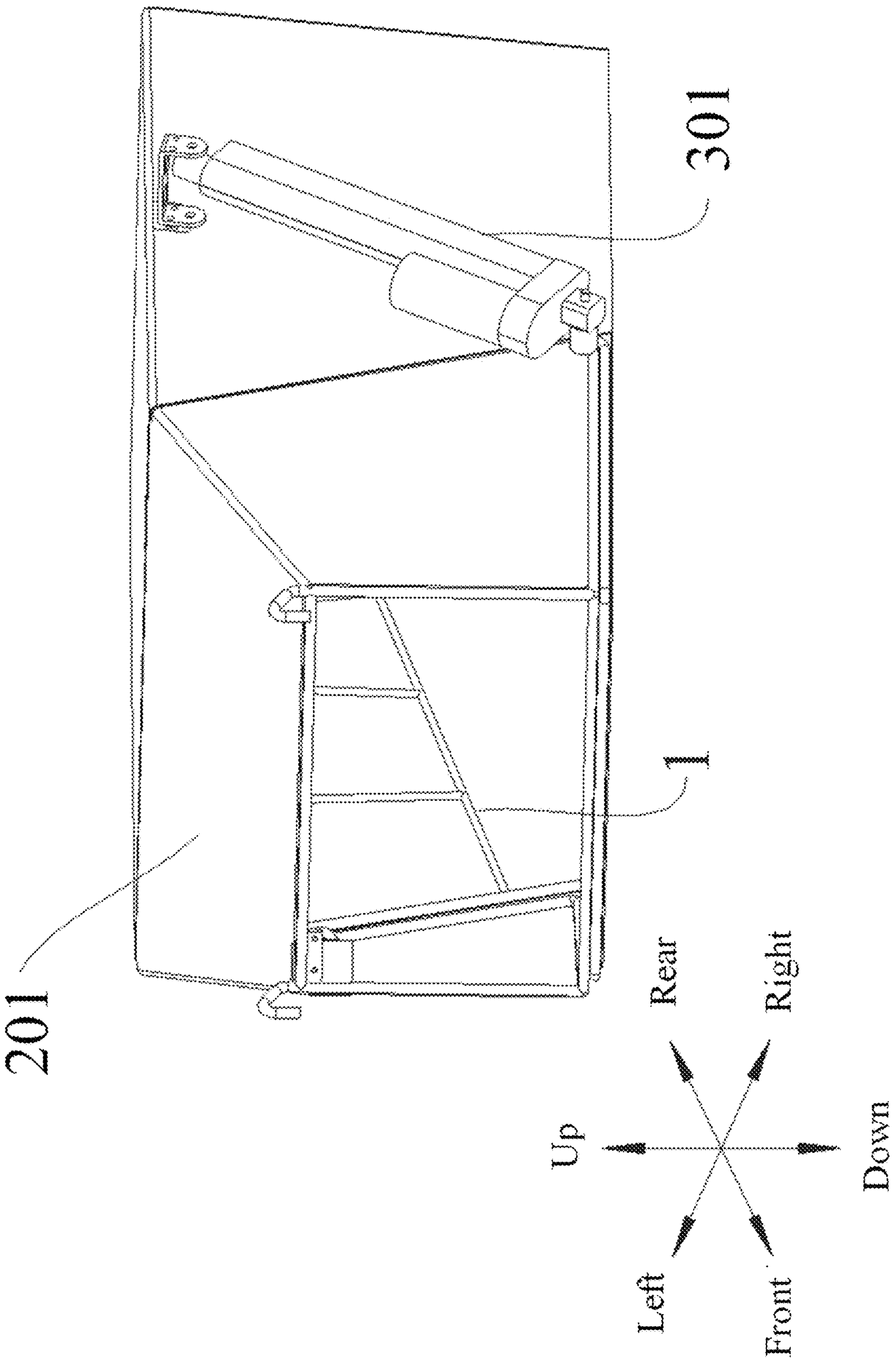
FIG. 7 is a structural schematic diagram of a grass collection device according to an implementation of the present disclosure.

In some implementations, as shown in FIGS. 7 and 9, the grass collection device further includes a telescopic mechanism 301, which is configured to open the rear frame body 12. The fixed end 31 of the telescopic mechanism 301 is connected to the lower portion of the front frame body 11, and the free end 32 of the telescopic mechanism 301 is connected to the upper portion of the rear frame body 12. When the grass in the grass collection bag 201 is full, the free end 32 of the telescopic mechanism 301 extends in a direction away from the fixed end 31, lifting the rear frame body 12 upward to discharge the grass. The telescopic mechanism 301 replaces manual labor, saving both time and effort.

However, when using the telescopic mechanism 301 to discharge the grass, the operator still needs to observe whether the grass in the grass collection bag 201 is full. When the grass in the grass collection bag 201 is full, the operator operates the telescopic mechanism 301 to discharge the grass. Although the trouble of manual grass discharge is eliminated, the operator still needs to observe on the side.

In some implementations, as shown in FIGS. 10 and 11, a grass-full detection unit 114 is arranged inside the front frame body 11. The grass-full detection unit 114 can be an ultrasonic sensor, an infrared sensor, or a millimeter-wave radar, etc. Considering that millimeter-wave radar has strong penetration, grass adhering to the millimeter-wave radar will not affect it, so millimeter-wave radar is used in this implementation. Multiple connecting columns 124 corresponding to the grass-full detection unit 114 are arranged inside the rear frame body 12, and the connecting columns 124 are staggered inside the rear frame body 12. The grass-full detection unit 114 is configured to detect whether the connecting columns 124 are covered by grass. The connecting columns 124 are metal columns. When there is no grass in the grass collection frame 1, the millimeter-wave radar can clearly identify all the connecting columns 124. As the amount of grass in the grass collection frame 1 increases, the connecting columns 124 are gradually covered by grass, and the number of connecting columns 124 identified by the millimeter-wave radar also gradually decreases. When the millimeter-wave radar cannot identify the connecting columns 124, it proves that the grass collection bag 201 is full. The telescopic mechanism 301 is electrically connected to the controller. The millimeter-wave radar sends a signal to the controller, and the controller drives the telescopic mechanism 301 to automatically discharge the grass, thereby realizing that the lawn mower can automatically detect grass-full and discharge the grass without the need for an operator.

During the normal operation of the lawn mower, the grass discharge opening may be blocked for various reasons. For example, when the millimeter-wave radar fails to detect in time and does not drive the telescopic mechanism 301 to discharge the grass in time, grass blockage will occur. After the grass is blocked, the lawn mower continues to cut grass, and the waste grass cannot be discharged, causing the waste grass to accumulate at the blade, resulting in blade damage.

In some implementations, a grass blockage detection unit is arranged at the grass outlet of the lawn mower body, and the grass blockage detection unit is configured to detect whether the grass outlet is blocked. The grass blockage detection unit can be an ultrasonic sensor or an infrared sensor, as long as it can detect whether the grass outlet is blocked.

In some implementations, as shown in FIGS. 8 and 9, the grass collection frame 1 includes multiple linearly-bent edges, which are configured to support the grass collection bag 201. After the grass collection bag 201 is supported, it is convenient for the grass collection bag 201 to collect grass. A handle 13 is arranged on the grass collection frame 1, and the handle 13 is adjacent to the telescopic mechanism 301. The handle 13 can be configured to manually lift the grass collection frame 1 with one hand. In addition, since the telescopic mechanism 301 is arranged on one side of the grass collection frame 1, the handle 13 is arranged adjacent to the telescopic mechanism 301, so that when the grass collection frame 1 is lifted with one hand, the force is balanced, making it more convenient to lift the grass collection frame 1 with one hand. Based on the same concept, the present disclosure also provides a lawn mower including the above-mentioned grass collection device.

It can be seen that the present disclosure discloses a grass collection device, which includes a grass collection frame and a grass collection bag. The grass collection frame includes a front frame body and a rear frame body. The front frame body is configured to connect to the lawn mower body, the front frame body is detachably connected to the lawn mower body, the rear frame body is rotatably connected to the front frame body, the grass collection bag includes a front bag portion and a rear bag portion, the front bag portion is adapted to the front frame body, the rear bag portion is adapted to the rear frame body, and the front bag portion and the rear bag portion are configured to be connected to each other in an openable manner. When the grass collection bag is sleeved on the grass collection frame, the front bag portion and the rear bag portion correspond to the front frame body and the rear frame body, respectively. When the grass collection bag is full of grass, the grass in the rear bag portion can be directly discharged by rotating the rear frame body, without removing the grass collection bag to discharge the grass. At the same time, the two-part structure of the grass collection frame facilitates the disassembly of the grass collection bag, making it easy to clean and replace.

FIGS. 13 to 19 show implementations of the grass collection device of the present disclosure, which include a grass collection frame 1 and a drive mechanism. The front side of the grass collection frame 1 is configured to connect to the lawn mower body, and the drive mechanism is connected to the grass collection frame 1 to drive the grass collection frame 1 to expand to increase the opening size of the grass discharge opening 14 of the grass collection device.

In the present disclosure, the drive mechanism drives the grass collection frame 1 to expand. After the grass collection frame 1 is expanded, the size of the grass discharge opening 14 for discharging grass is increased. After the size of the grass discharge opening 14 is increased, the grass is more easily discharged, making grass discharge more convenient.

Figure 13:
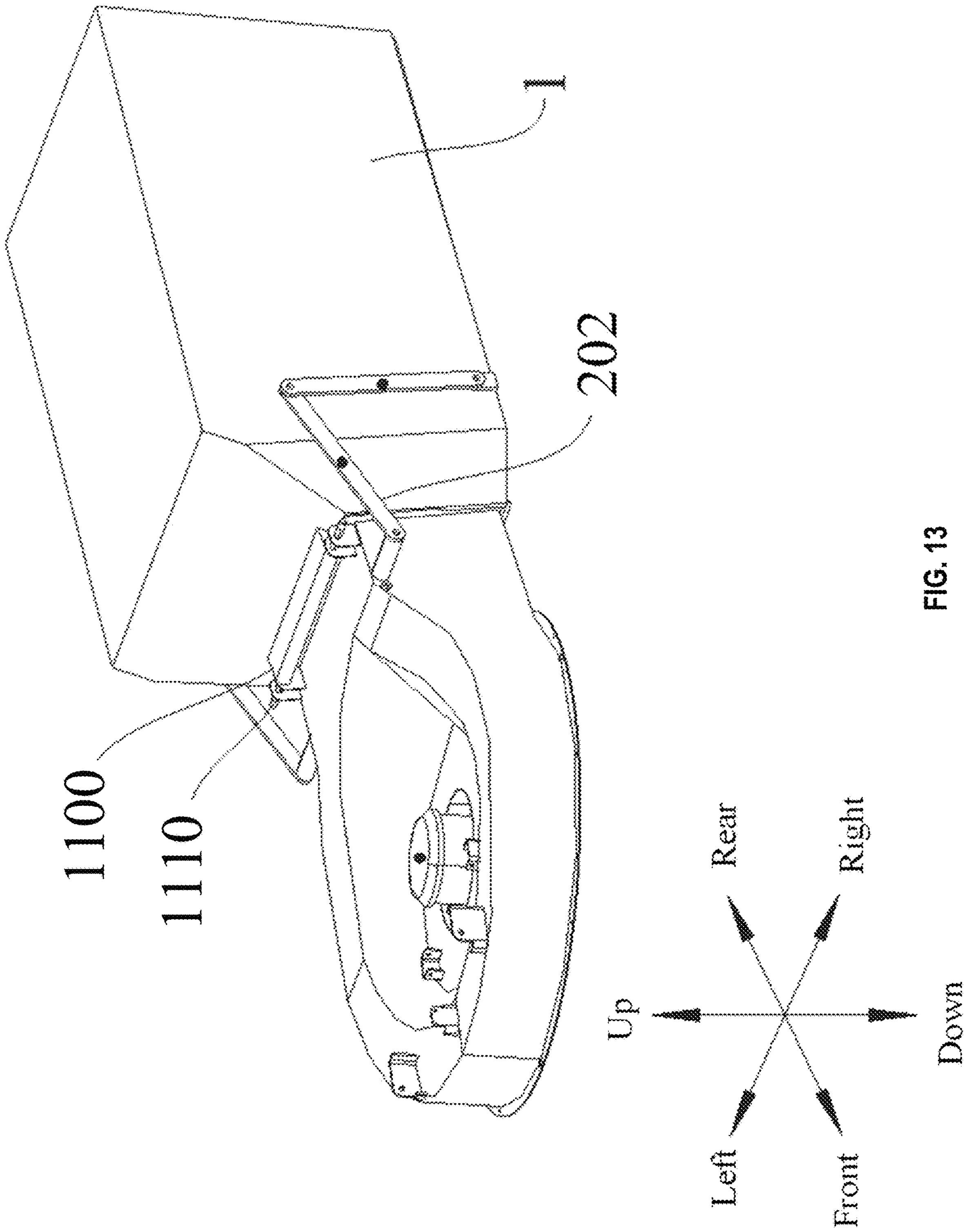
FIG. 13 is a structural schematic diagram of an implementation according to the present disclosure.
Figure 14:
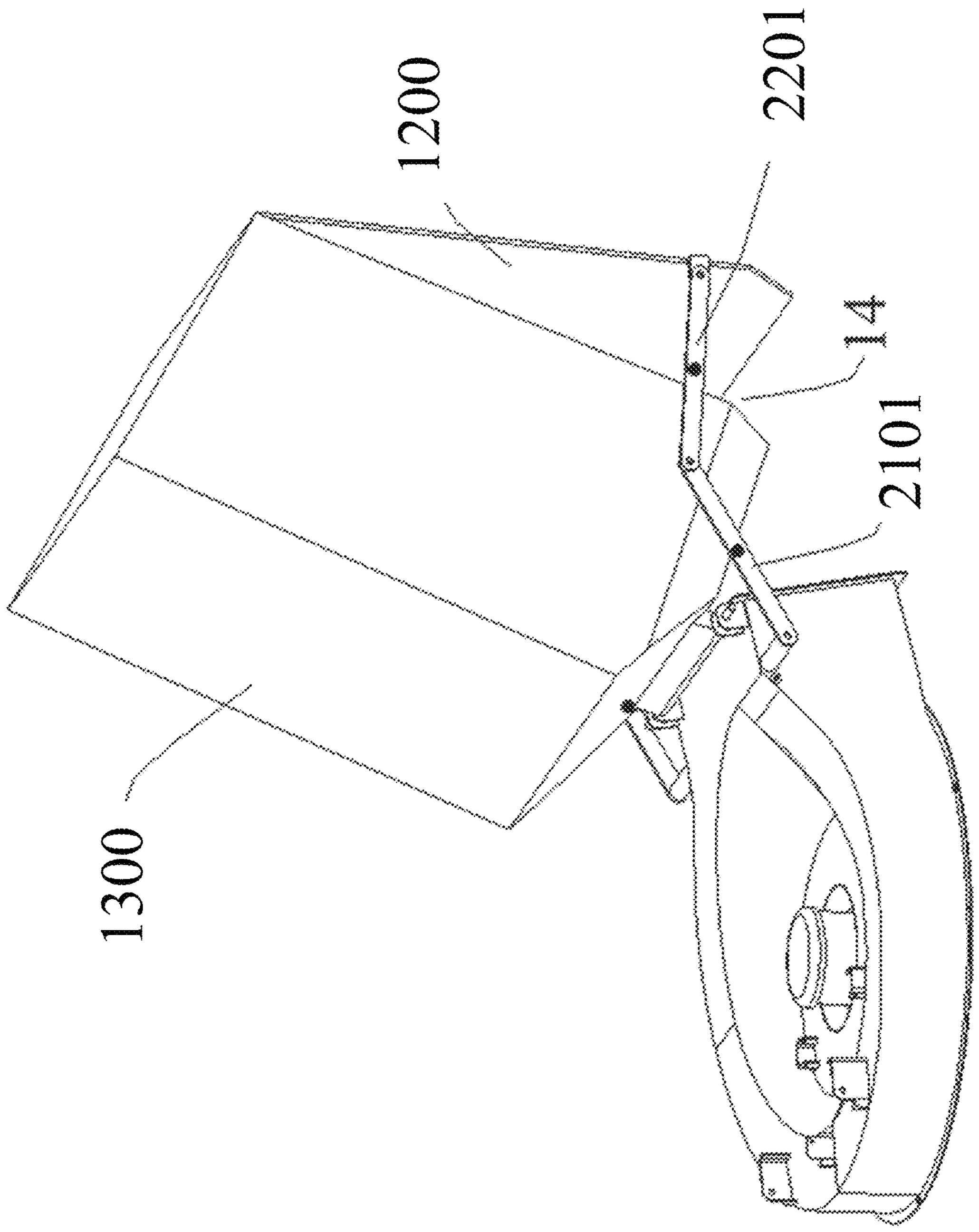
FIG. 14 is a structural schematic diagram of the grass collection frame in the open state according to an implementation of the present disclosure.

In some implementations, as shown in FIGS. 13 and 14, the upper side of the front portion of the grass collection frame 1 is provided with a hinge portion 1100 hinged to the lawn mower body. The grass collection frame 1 and the lawn mower body can be hinged by a hinge shaft 1110. The drive mechanism (not shown in the drawings) can be a drive motor.

The drive shaft of the drive motor is fixedly connected to the hinge shaft 1110. The hinge shaft 1110 is fixedly connected to the grass collection frame 1 and rotatably connected to the lawn mower body. The rotation of the drive motor can drive the hinge shaft 1110 and the grass collection frame 1 to rotate, so that the grass collection frame 1 rotates upward to open for grass discharge, and then rotates downward to close for grass collection.

The drive mechanism can also be a telescopic rod. The fixed end of the telescopic rod is arranged on the lawn mower body, and the free end is connected to the grass collection frame 1. When the telescopic rod extends, it drives the grass collection frame 1 to rotate upward about the hinge shaft 1110. When the telescopic rod extends, it drives the grass collection frame 1 to rotate upward about the hinge shaft 1110 to open for grass discharge, and when the telescopic rod contracts, it drives the grass collection frame 1 to rotate downward about the hinge shaft 1110 to close for grass collection.

After the drive mechanism drives the grass collection frame 1 to rotate upward, the grass discharge opening 14 faces downward, making it easier to discharge the grass. When discharging the grass in this way, the opening size of the grass discharge opening 14 of the grass collection device can be increased by opening the bottom plate 1200 of the grass collection frame 1.

In some implementations, the grass collection frame 1 includes a bottom plate 1200 and an outer frame body 1300. The outer frame body 1300 encloses the upper portion of the bottom plate 1200 and forms a frame structure with the bottom plate 1200. The rear end of the bottom plate 1200 is hinged to the rear end of the outer frame body 1300. The front end of the bottom plate 1200 corresponds to the grass discharge opening 14. The front end of the bottom plate 1200 is provided with a linkage mechanism 202. The linkage mechanism 202 is connected between the bottom plate 1200 and the lawn mower body and is configured to expand the front end of the bottom plate 1200 to increase the opening size of the grass discharge opening 14.

The linkage mechanism 202 can be a planar four-bar linkage or a spatial linkage, etc. In some implementations, the linkage mechanism 202 includes a first link 2101 and a second link 2201. The first end of the first link 2101 is connected to the lawn mower body, the second end of the first link 2101 is hinged to the first end of the second link 2201, and the second end of the second link 2201 is connected to the front portion of the bottom plate 1200.

When the drive mechanism drives the grass collection frame 1 to rotate upward, as the grass collection frame 1 rotates upward, the linkage mechanism 202 expands, the angle at the hinge between the first link 2101 and the second link 2201 increases, and the front end of the bottom plate 1200 is separated from the outer frame body 1300 by the first link 2101 and the second link 2201. At this time, the opening between the front end of the bottom plate 1200 and the outer frame body 1300 can be used as the grass discharge opening 14 for grass discharge, which greatly increases the opening of the grass discharge opening 14 and facilitates the discharge of grass.

Figure 15:
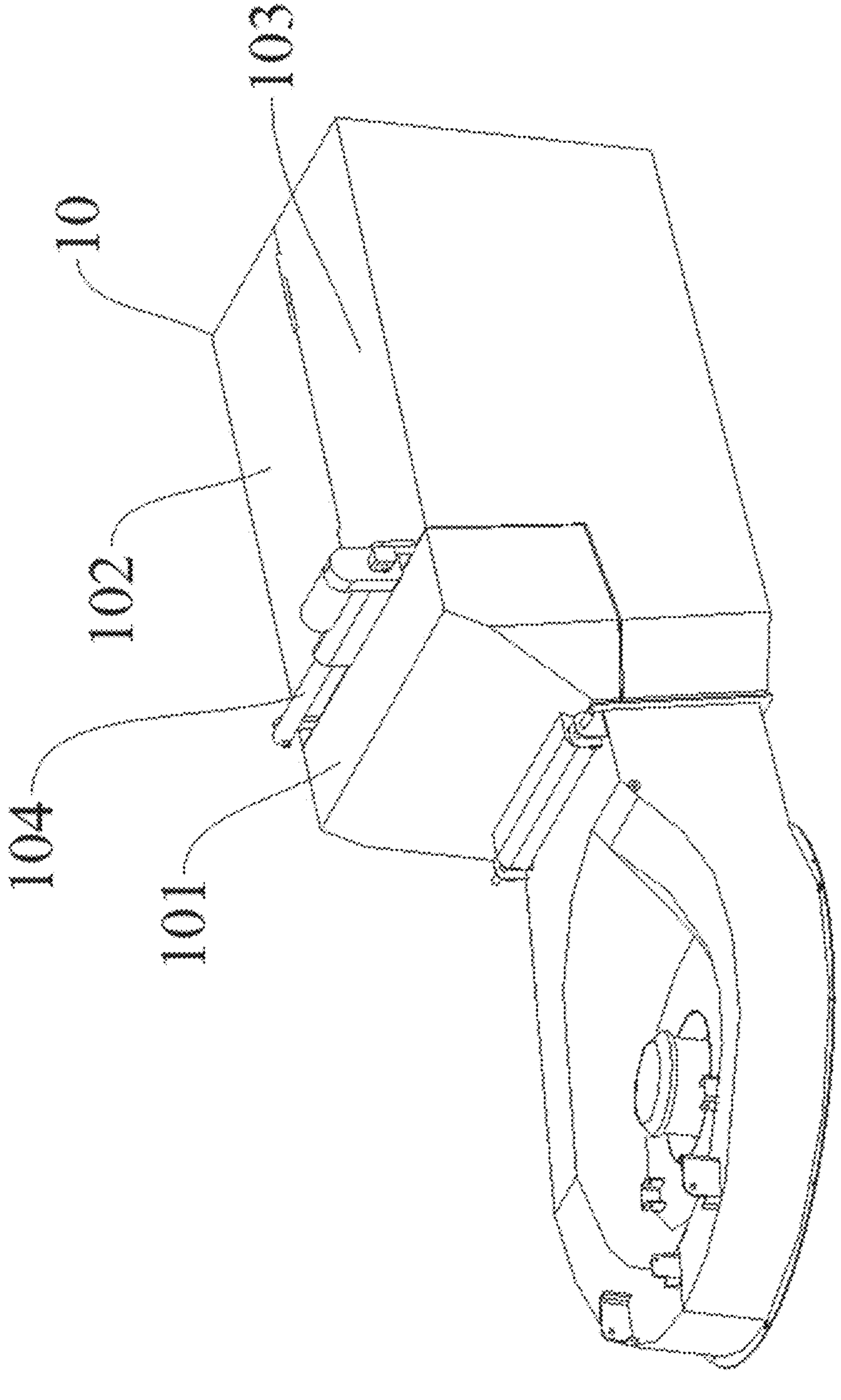
FIG. 15 is a structural schematic diagram of another implementation according to the present disclosure.
Figure 16:
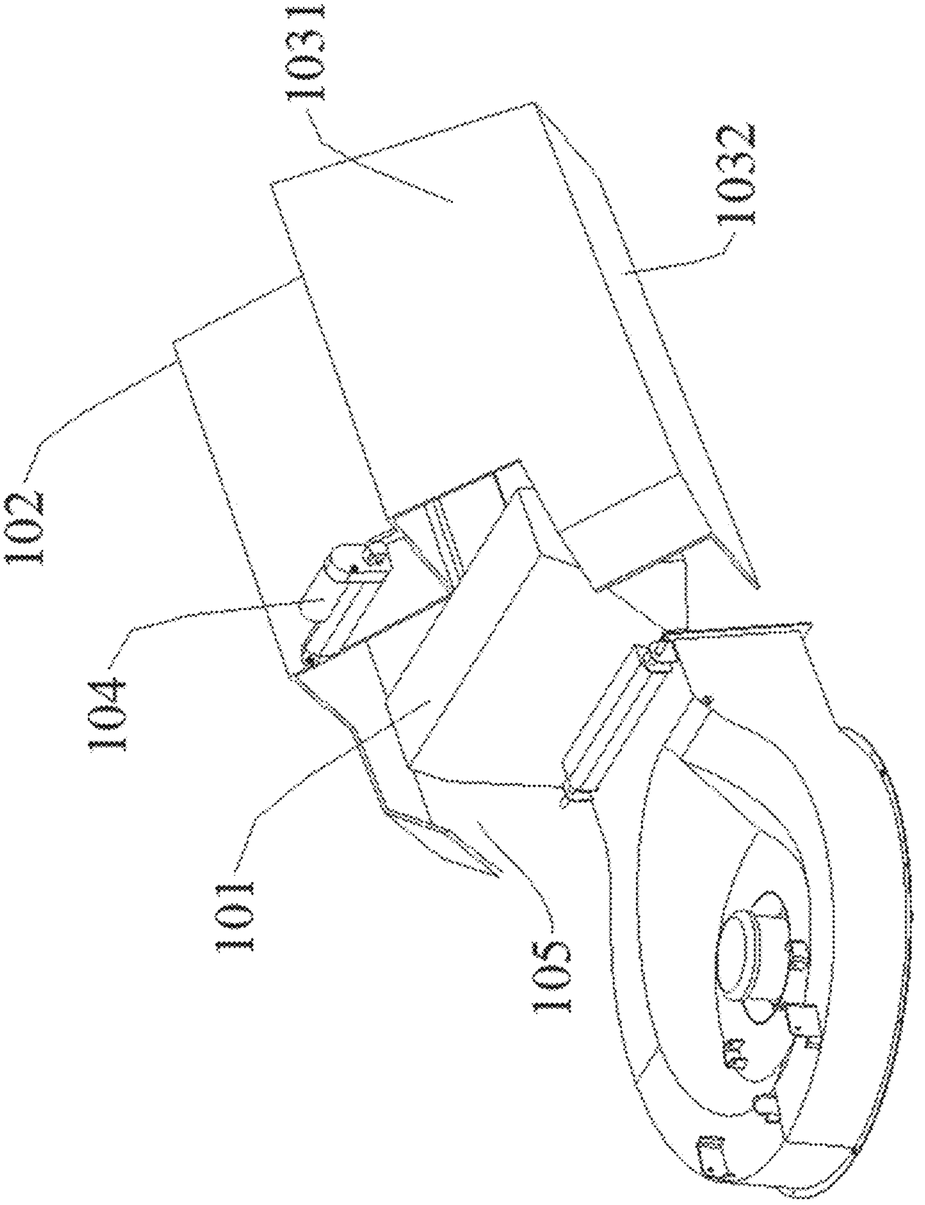
FIG. 16 is a structural schematic diagram of the grass collection frame in the open state according to another implementation of the present disclosure.

In another implementation, as shown in FIGS. 15 and 16, the grass collection frame 10 can be hinged to the lawn mower body (in the same way as described above), or fixedly or detachably connected to the lawn mower body. Taking the example of the grass collection frame 10 being fixedly or detachably connected to the lawn mower body, the grass collection frame 10 includes a front frame body 101, a left frame body 102, and a right frame body 103. The front frame body 101 is connected to the lawn mower body, the left frame body 102 and the right frame body 103 are respectively arranged on the left and right sides of the rear portion of the front frame body 101, and the front frame body 101, the left frame body 102, and the right frame body 103 enclose to form a frame structure. The left frame body 102 and the right frame body 103 can expand relative to each other. For example, the drive mechanism (not shown in the drawings) can be a drive motor. Both the left frame body 102 and the right frame body 103 can be provided with pull ropes. One end of the pull rope is connected to the left frame body 102 or the right frame body 103, and the other end is wound on the output shaft of the drive motor. When the drive motor rotates forward, the pull rope is tightened to pull the left frame body 102 and the right frame body 103 to rotate upward and expand for grass discharge. When the drive motor rotates in reverse, the pull rope is loosened, and the left frame body 102 and the right frame body 103 rotate downward to close for grass collection.

In some implementations, a fixed rod 104 is arranged in the middle of the front frame body 101. The fixed rod 104 is configured to support the left frame body 102 and the right frame body 103. The inner edges of the left frame body 102 and the right frame body 103 are respectively hinged to the fixed rod 104. The drive mechanism is a telescopic rod. One end of the drive mechanism is hinged to the outside of the left frame body 102, and the other end is hinged to the outside of the right frame body 103. In some implementations, both the left frame body 102 and the right frame body 103 are provided with protrusions on the upper end surface, and the drive mechanism is hinged to the protrusions.

When the drive mechanism is in the extended state, the left frame body 102 and the right frame body 103 are closed, and together with the front frame body 101, form a frame structure for grass collection. When the drive mechanism contracts, the upper sides of the left frame body 102 and the right frame body 103 approach each other, and the lower sides expand. At this time, the expanded portions of the lower sides of the left frame body 102 and the right frame body 103 form the grass discharge opening 105.

The front frame body 101 can be a frame structure. In order to further increase the opening size of the grass discharge opening 105, in some implementations, both the left frame body 102 and the right frame body 103 include a frame portion 1031 and an extension portion 1032. The frame portion 1031 is located at the rear side of the front frame body 101, and the extension portion 1032 is located at the lower side of the front frame body 101. This allows the lower portion of the front frame body 101 to also open, further increasing the opening size of the grass discharge opening 105.

In the above two implementations, the grass can be collected directly in the grass collection frame 10, or a grass collection bag can be arranged inside the grass collection frame 10 to collect the grass in the grass collection bag of the grass collection frame 10, and then the grass collection bag can be removed from the grass collection frame 10 by the above method.

When a grass collection bag is arranged inside the grass collection frame 10, a sealing mechanism can also be arranged on the front side of the grass collection frame 10 to seal the grass collection bag. By sealing the grass collection bag with the sealing mechanism, the grass inside the grass collection bag can be prevented from flowing out, and the grass collection bag can be directly collected, avoiding the need to seal the grass collection bag again, thereby improving the convenience of grass collection.

Figure 17:
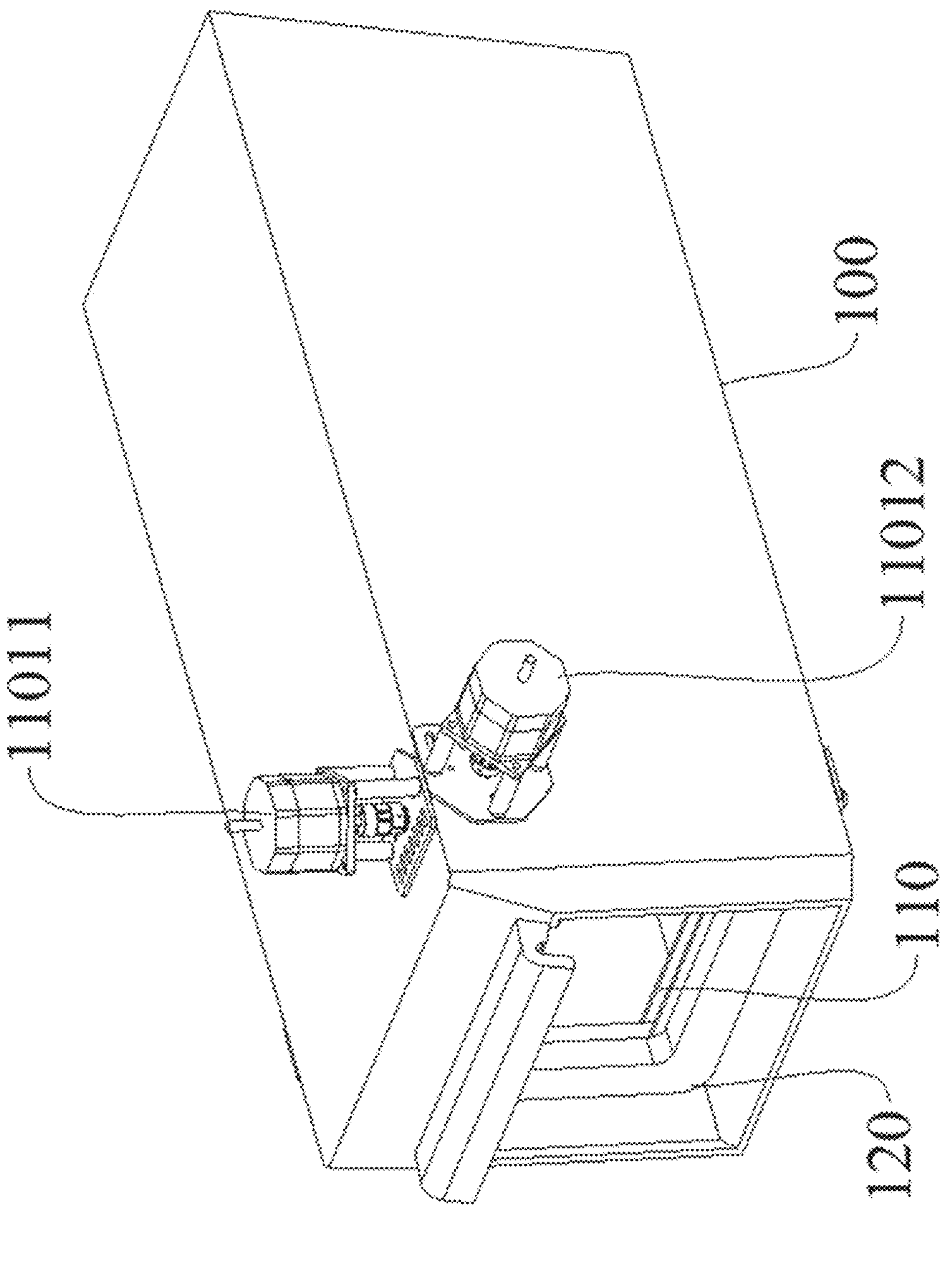
FIG. 17 is a structural schematic diagram of yet another implementation according to the present disclosure.
Figure 18:
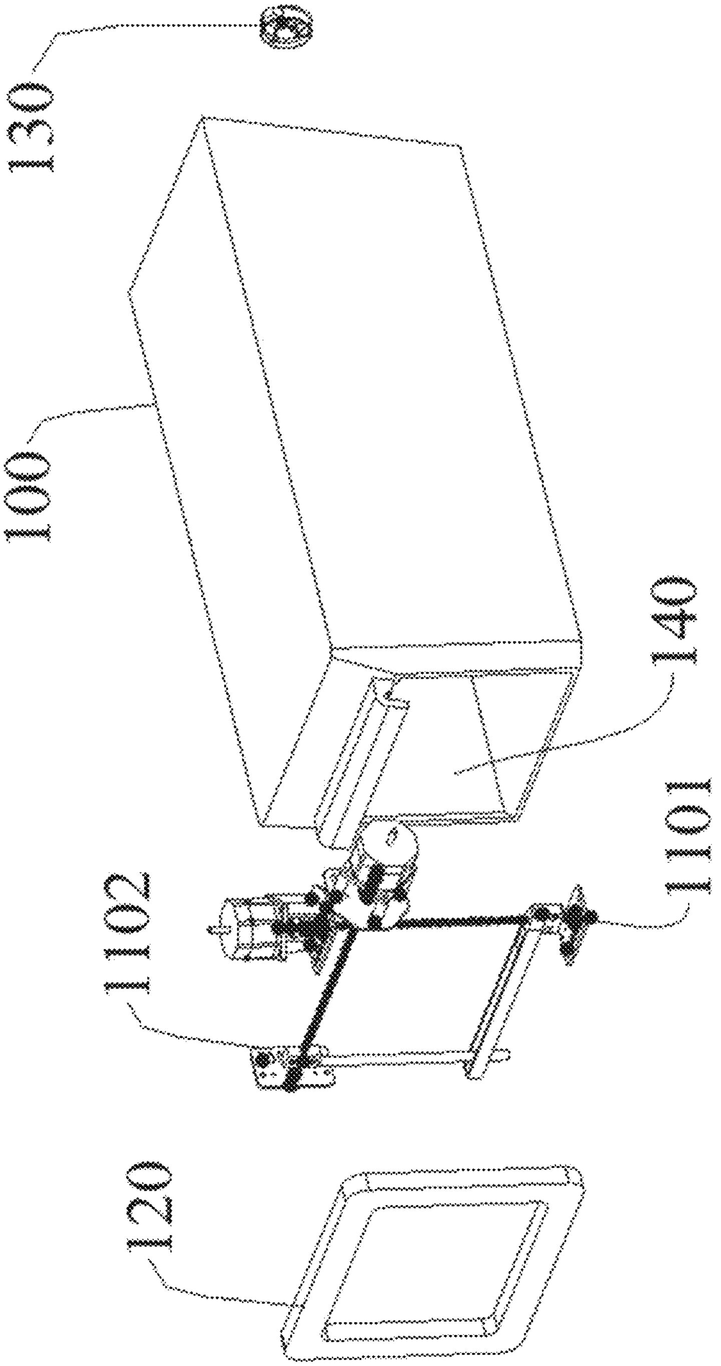
FIG. 18 is an exploded structural schematic diagram of yet another implementation according to the present disclosure.
Figure 19:
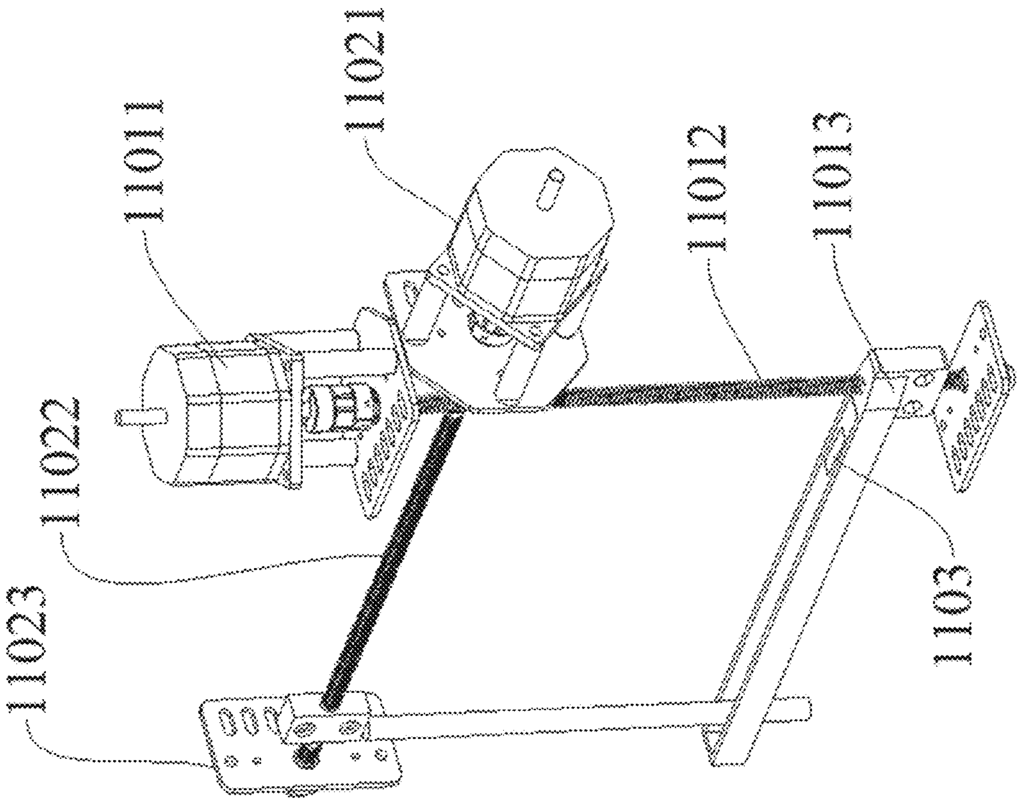
FIG. 19 is a structural schematic diagram of the sealing mechanism according to yet another implementation of the present disclosure.

In another implementation, as shown in FIGS. 17 to 19, a sealing mechanism 110 is arranged on the front side inside the grass collection frame 100. A storage box 120 is arranged on the front side of the sealing mechanism 110. The grass collection bag is stored in the storage box 120. The grass collection bag is in the form of a long tube, with only one sealed end at the bottom, and the sealing mechanism forms a new sealed end at the bottom while sealing the grass collection bag. A suction fan 130 is arranged at the rear portion of the grass collection frame 100. When there is no grass collection bag in the grass collection frame 100, the suction fan 130 creates a pressure difference by suction to suck the grass collection bag from the storage box 120 into the grass collection frame 100, so that the grass collection bag fits closely to the inner wall of the grass collection frame 100, and then the lawn mower starts mowing and collecting grass. When the grass collection bag is full of grass, the sealing mechanism 110 seals the grass collection bag. When the grass collection bag is full of grass, the opening is usually large and cannot be sealed directly. When the sealing mechanism 110 seals the grass collection bag, it first tightens the opening of the grass collection bag to gather it together, and then seals it.

In some implementations, the sealing mechanism 110 includes a vertical sliding assembly 1101, a horizontal sliding assembly 1102, and a hot-melt component 1103. The vertical sliding assembly 1101 is vertically arranged on the grass collection frame 100, the horizontal sliding assembly 1102 is horizontally arranged on the grass collection frame 100, the hot-melt component 1103 is arranged on the vertical sliding assembly 1101 or the horizontal sliding assembly 1102, the vertical sliding assembly 1101 and the horizontal sliding assembly 1102 are configured to gather the grass collection bag at the grass discharge opening 140, and the hot-melt component 1103 is configured to hot-melt seal and cut the gathered grass collection bag.

The vertical sliding assembly 1101 and the horizontal sliding assembly 1102 slide to gather the grass collection bag in one direction, and then the hot-melt component 1103 hot-melt seals and cuts the gathered grass collection bag, thereby realizing the sealing of the grass collection bag and improving the convenience of grass collection.

In some implementations, the vertical sliding assembly 1101 includes a vertical motor 11011, a vertical screw rod 11012, and a vertical sliding piece 11013. The vertical motor 11011 is vertically arranged on the outer surface of the upper end of the grass collection frame 100. The output shaft of the vertical motor 11011 is connected to one end of the vertical screw rod 11012 to drive the vertical screw rod 11012 to rotate. The other end of the vertical screw rod 11012 is rotatably connected to the grass collection frame 100 on the side opposite to the vertical motor 11011 via a bearing. The vertical sliding piece 11013 is screwed to the vertical screw rod 11012. The rotation of the vertical screw rod 11012 causes the vertical sliding piece 11013 to move vertically along the vertical screw rod 11012. The vertical motor 11011 drives the vertical screw rod 11012 to rotate, and the rotation of the vertical screw rod 11012 further drives the vertical sliding piece 11013 to move, thereby tightening the grass collection bag in the vertical direction.

The horizontal sliding assembly 1102 includes a horizontal motor 11021, a horizontal screw rod 11022, and a horizontal sliding piece 11023. The horizontal motor 11021 is horizontally arranged on the outer surface of the side of the grass collection frame 100. The output shaft of the horizontal motor 11021 is connected to one end of the horizontal screw rod 11022 to drive the horizontal screw rod 11022 to rotate. The other end of the horizontal screw rod 11022 is rotatably connected to the grass collection frame 100 on the side opposite to the horizontal motor 11021 via a bearing. The horizontal sliding piece 11023 is screwed to the horizontal screw rod 11022. The rotation of the horizontal screw rod 11022 causes the horizontal sliding piece 11023 to move horizontally along the horizontal screw rod 11022. The horizontal motor 11021 drives the horizontal screw rod 11022 to rotate, and the rotation of the horizontal screw rod 11022 further drives the horizontal sliding piece 11023 to move, thereby tightening the grass collection bag in the horizontal direction.

The horizontal sliding piece 11023 is in a rod-shaped structure, the vertical sliding piece 11013 is in a frameshaped structure, the upper end of the horizontal sliding piece 11023 is screwed to the horizontal screw rod 11022, the lower end is inserted into the vertical sliding piece 11013, and the horizontal motor 11021 drives the horizontal sliding piece 11023 to move transversely. The right end of the vertical sliding piece 11013 is screwed to the vertical screw rod 11012, and the left end is inserted into the horizontal sliding piece 11023. The vertical motor 11011 drives the vertical sliding piece 11013 to move vertically.

The vertical sliding piece 11013, the horizontal sliding piece 11023, the vertical screw rod 11012, and the horizontal screw rod 11022 together form a quadrilateral frame, and the grass collection bag passes through and extends out of this quadrilateral frame. The hot-melt component 1103 is arranged at the right end of the vertical sliding piece 11013. As the vertical sliding piece 11013 and the horizontal sliding piece 11023 move, the quadrilateral frame gradually shrinks. The opening of the grass collection bag is tightened and gathered toward the upper right corner, and then the hot-melt component 1103 hot-melt seals and cuts the gathered grass collection bag.

The sealing mechanism 110 used in this implementation can be combined with the grass collection device described in the above two implementations, specifically by adding the sealing mechanism 110 at the grass discharge opening 140 of the above two grass collection devices, so that the grass collection bag is sealed before being discharged, making it more convenient.

It should be noted that when the sealing mechanism 110 is added to the grass collection device, some improvements need to be made to the grass collection frame 100. Since the sealing mechanism 110 is installed inside the grass collection frame 100, the front portion of the grass collection frame 100 can be arranged as an integrated fixed structure for fixing the sealing mechanism 110, and the rear portion can be arranged to open the bottom plate or open both sides as in the above implementations to increase the opening size of the grass discharge opening 140.

It can be seen that the present disclosure discloses a grass collection device, which includes a grass collection frame and a drive mechanism. The front side of the grass collection frame is configured to connect to the lawn mower body, and the drive mechanism is connected to the grass collection frame to drive the grass collection frame to expand to increase the opening size of the grass discharge opening of the grass collection device. The drive mechanism drives the grass collection frame to expand. After the grass collection frame is expanded, the size of the grass discharge opening for discharging grass is increased. After the size of the grass discharge opening is increased, the grass is more easily discharged, making grass discharge more convenient. The grass collection frame can be used directly for grass collection or by arranging a grass collection bag inside the grass collection frame for grass collection. When a grass collection bag is arranged inside the grass collection frame, a sealing mechanism is added to the grass collection device. When the grass collection bag is full of grass, the sealing mechanism seals the grass collection bag.

The above are only implementations of the present disclosure and do not limit the scope of the present disclosure. Any equivalent structural changes made using the content of the present disclosure of the specification and drawings, or directly or indirectly applied to other related technical fields, are also included in the scope of patent protection of the present disclosure.

What is claimed is:

1. A grass collection mechanism, comprising:

a grass collection frame; and a conductive detection sensor configured to detect whether the grass collection frame is full and comprising at least one detection unit and a processing unit, wherein:

the at least one detection unit is arranged on top of the grass collection frame and configured to be electrically connected to cut grass, the at least one detection unit being in a form of a conductive pillar comprising carbon fiber or metal; and the processing unit is electrically connected to the at least one detection unit and configured to determine whether the at least one detection unit is electrically connected with the cut grass.

2. The grass collection mechanism according to claim 1, wherein the at least one detection unit comprises a plurality of detection units arranged in a straight line at intervals on the top of the grass collection frame.

3. The grass collection mechanism according to claim 1, wherein the at least one detection unit is arranged on each edge of the grass collection frame.

4. The grass collection mechanism according to claim 1, wherein:

the at least one detection unit comprises a first conductor serving as a positive electrode and a second conductor serving as a negative electrode, each of the first conductor and the second conductor being electrically connected to the processing unit; and the first conductor and the second conductor are spaced apart and protrude from the grass collection frame and extend by a preset distance.

5. The grass collection mechanism according to claim 1, further comprising a distance sensor configured to detect a distance between the cut grass collected in the grass collection frame and the top of the grass collection frame, the distance sensor comprising one of infrared, laser, ultrasonic, or millimeter-wave radar.

6. A grass collection device, comprising:

a grass collection frame comprising a front frame body configured to be detachably connected to a lawn mower body and a rear frame body configured to be rotatably connected to the front frame body; and a grass collection bag comprising a front bag portion and a rear bag portion, wherein:

the front bag portion is adapted to the front frame body, the rear bag portion is adapted to the rear frame body, and the front bag portion and the rear bag portion are configured to be connected to each other in an openable manner;

a grass-full detection unit is arranged within the front frame body, and a plurality of connecting columns corresponding to the grass-full detection unit are arranged within the rear frame body; and the connecting columns are staggered within the rear frame body, and the grass-full detection unit is configured to detect whether the connecting columns are covered by cut grass.

7. The grass collection device according to claim 6, wherein:

the front frame body is arranged with a first opening away from the rear frame body and a second opening adjacent to the rear frame body; and an upper portion of the second opening is inclined towards the first opening.

8. The grass collection device according to claim 7, wherein the rear frame body comprises:

a connecting portion adapted to the second opening;

a first supporting portion arranged at a lower end of the connecting portion and extending into the front frame body; and a second supporting portion arranged at an upper end of the connecting portion and extending in a direction away from the rear frame body, wherein an upper portion of the connecting portion is hinged to the front frame body.

9. The grass collection device according to claim 6, wherein a hook is arranged on a front side of the front frame body, and the hook is connected to a rear portion of the lawn mower body.

10. The grass collection device according to claim 6, further comprising a telescopic mechanism configured to open the rear frame body, wherein a fixed end of the telescopic mechanism is connected to a lower portion of the front frame body, and a free end of the telescopic mechanism is connected to an upper portion of the rear frame body.

11. The grass collection device according to claim 10, wherein:

the grass collection frame comprises a plurality of linearly-bent edges; and a handle is arranged on the grass collection frame, the handle being adjacent to the telescopic mechanism.

12. The grass collection device according to claim 6, wherein an upper portion of the front bag portion and an upper portion of the rear bag portion are of an integrated structure, and a left side portion, a right side portion, and a lower side portion of the front bag portion and the rear bag portion are configured to be connected in an openable manner.

13. The grass collection device according to claim 6, wherein a grass blockage detection unit is arranged at a grass outlet of the lawn mower body and configured to detect whether the grass outlet is blocked.

14. A grass collection device, comprising:

a grass collection frame and a drive mechanism, wherein:

a front side of the grass collection frame is configured to connect to a lawn mower body;

the grass collection frame comprises a front frame body, a left frame body, and a right frame body, the front frame body being connected to the lawn mower body, the left frame body and the right frame body being respectively arranged on left and right sides of a rear portion of the front frame body; and the drive mechanism is connected to the grass collection frame to drive a first portion of the left frame body and a first portion of the right frame body to separate from each other to create a grass discharge opening of the grass collection device facing downward.

15. The grass collection device according to claim 14, wherein:

the front frame body is hinged to the lawn mower body, and the left frame body and the right frame body are capable of expanding relative to each other.

16. The grass collection device according to claim 14, wherein:

a grass collection bag is arranged within the grass collection frame; and a sealing mechanism is arranged on an internal front side of the grass collection frame, the sealing mechanism being configured to seal the grass collection bag.

17. The grass collection device according to claim 14, wherein:

a second portion of the left frame body and a second portion of the right frame body are rotatably connected with each other.

18. The grass collection device according to claim 14, wherein:

each of the left frame body and the right frame body comprises a frame portion and an extension portion; and when the drive mechanism is activated, the frame portion of the left frame body and the frame portion of the right frame body are driven to rotate upward, and the extension portion of the left frame body and the extension portion of the right frame body move away from each other and enlarge a downward-facing opening between the extension portion of the left frame body and the extension portion of the right frame body for grass discharge.

* * * * *